US008688140B2

(12) United States Patent
Németh

(10) Patent No.: US 8,688,140 B2
(45) Date of Patent: Apr. 1, 2014

(54) RADIO FREQUENCY TAG LOCATION SYSTEM AND METHOD

(75) Inventor: József G. Németh, Budapest (HU)

(73) Assignee: Microchip Technology Incorporated, Chandler, AZ (US)

( * ) Notice: Subject to any disclaimer, the term of this patent is extended or adjusted under 35 U.S.C. 154(b) by 69 days.

(21) Appl. No.: 13/420,023

(22) Filed: Mar. 14, 2012

(65) Prior Publication Data

US 2012/0276921 A1     Nov. 1, 2012

Related U.S. Application Data

(60) Provisional application No. 61/479,045, filed on Apr. 26, 2011.

(51) Int. Cl.
*H04W 72/00*     (2009.01)
*H04B 7/00*     (2006.01)
*H04W 4/00*     (2009.01)

(52) U.S. Cl.
USPC .......... 455/456.1; 455/450; 455/507; 370/329

(58) Field of Classification Search
USPC ............. 455/507, 456.1; 370/208, 260, 344, 370/371, 346, 329; 375/344; 340/572.1, 340/527.7, 10.3; 342/357.74
See application file for complete search history.

(56) References Cited

U.S. PATENT DOCUMENTS

| 3,872,477 | A | 3/1975 | King | 343/120 |
|---|---|---|---|---|
| 6,590,498 | B2* | 7/2003 | Helms | 340/572.7 |
| 2003/0197645 | A1 | 10/2003 | Ninomiya et al. | 342/464 |
| 2009/0154489 | A1* | 6/2009 | Bae et al. | 370/462 |
| 2010/0245050 | A1* | 9/2010 | Shiotsu et al. | 340/10.3 |
| 2013/0147609 | A1* | 6/2013 | Griffin et al. | 340/10.5 |

FOREIGN PATENT DOCUMENTS

| EP | 0330541 A1 | 8/1989 | G01S 1/30 |
|---|---|---|---|
| EP | 2237066 A1 | 10/2010 | G01S 13/75 |

OTHER PUBLICATIONS

International PCT Search Report and Written Opinion, PCT/US2012/033771, 15 pages, Jun. 26, 2012.

* cited by examiner

*Primary Examiner* — Nizar Sivji
(74) *Attorney, Agent, or Firm* — King & Spalding L.L.P.

(57) ABSTRACT

Determination of the location and bearing of an asset having an RF-tag imbedded therein is accomplished through extended radio frequency triangulation. A beacon arrangement determines the direction of an RF tag from a specially designed beacon node. RF-tag localization is further improved by repeating this measurement from multiple spatially displaced beacon nodes. The beacon nodes are equipped with multiple strategically located antennas and transmit frames with each symbol cyclically switched to a different antenna. The symbols traveling different distances result in phase shifts within the frame received by the RF-tag. From the phase shifts and the known arrangements of the antennas the angle at which the RF-tag is RF visible from the specific beacon node can be estimated. Determination of the signal phase shifts are part of the baseband processing hardware, the rest of the location determination procedure may be realized in software.

28 Claims, 16 Drawing Sheets

RADIO FREQUENCY TAG LOCATION SYSTEM AND METHOD

RELATED PATENT APPLICATION

This application claims priority to commonly owned U.S. Provisional Patent Application Ser. No. 61/479,045; filed Apr. 26, 2011; entitled "Radio Frequency Tag Location System and Method," by József G. Németh; which is hereby incorporated by reference herein for all purposes.

TECHNICAL FIELD

The present disclosure relates to radio frequency tags, and, more particularly, to a system and method for locating the radio frequency tags.

BACKGROUND

Location of items and packages having radio frequency tags (RF-tags) imbedded therein is important for inventory control and package tracking, among other applications.

SUMMARY

What is needed is an inexpensive and low-power RF-tag location system, method and apparatus that is competitive with received signal strength indication (RSSI) based methods, while providing superior positional accuracy.

According to an embodiment, a method for locating a radio frequency tag using spatially separated beacon nodes may comprise the steps of: transmitting a plurality of beacon symbols from cyclically selected antennas of each of a plurality of beacon nodes; receiving the plurality of beacon symbols at a radio frequency (RF) tag; determining phase jumps of the plurality of beacon symbols received at the RF tag and the respective selected antennas transmitting each of the plurality of beacon symbols for each of the plurality of beacon nodes; estimating an angle-of-arrival (AoA) of the plurality of beacon symbols transmitted from each of the plurality of beacon nodes; estimating an AoA vector for each of the plurality of beacon nodes from the respective AoA estimates; and estimating a spatial location of the RF tag from the AoA vectors.

According to a further embodiment of the method, each next one of the plurality of beacon symbols may be transmitted from a next one of the cyclically selected antennas. According to a further embodiment of the method, every other next one of the plurality of beacon symbols is transmitted from a next one of the cyclically selected antennas. According to a further embodiment of the method, the plurality of beacon symbols may be payload portions of IEEE 802.15.4 standard compliant frames. According to a further embodiment of the method, the step of estimating the AoA of the plurality of beacon symbols transmitted from each of the plurality of beacon nodes may comprise the step of determining the phase jump of each one of the plurality of beacon symbols in relation to a respective one of the cyclically selected antennas transmitting the one of the plurality of beacon symbols. According to a further embodiment of the method, the step of estimating the AoA of the plurality of beacon symbols transmitted from each of the plurality of beacon nodes may comprise the step of determining the phase jump of every other one of the plurality of beacon symbols in relation to a respective one of the cyclically selected antennas transmitting the every other one of the plurality of beacon symbols. According to a further embodiment of the method, the step of estimating the AoA may provide an azimuth angle estimation. According to a further embodiment of the method, the step of estimating the AoA may provide an elevation angle estimation.

According to a further embodiment of the method, the steps of calibrating position and orientation of each one of the plurality of beacon nodes may further comprise: transmitting a plurality of beacon symbols from the cyclically selected antennas of a one of the plurality of beacon nodes; and receiving the plurality of beacon symbols on another one of the plurality of beacon nodes with a one of the antennas of the another one of the plurality of beacon nodes. According to a further embodiment of the method, the steps of calibrating position and orientation of each one of the plurality of beacon nodes may further comprise: transmitting a plurality of beacon symbols from a one of the antennas of a one of the plurality of beacon nodes; and receiving the plurality of beacon symbols on another one of the plurality of beacon nodes with the cyclically selected antennas of the another one of the plurality of beacon nodes. According to a further embodiment of the method, additional steps may comprise: providing a central processing node; and providing a network for coupled the central processing node to the plurality of beacon nodes.

According to a further embodiment of the method, each of the plurality of beacon nodes may comprises: a radio frequency (RF) device; an antenna switch coupled between the RF device and the cyclically selected antennas; and a digital processor having outputs that control the antenna switch and a trigger input coupled to the RF device, wherein when a switch antenna signal is received from the RF device the digital processor causes the antenna switch to coupled the RF device to a different one of the antenna. According to a further embodiment of the method, the digital processor is a microcontroller. According to a further embodiment of the method, the digital processor is selected from the group consisting of a microprocessor, a digital signal processor (DSP), a programmable logic array (PLA) and an application specific integrated circuit (ASIC).

According to another embodiment, a method for locating a radio frequency tag using spatially separated beacon nodes may comprise the steps of: transmitting a plurality of beacon symbols from an antenna of a radio frequency (RF) tag; receiving the plurality of beacon symbols on cyclically selected antennas of each of a plurality of beacon nodes; determining phase jumps of the plurality of beacon symbols transmitted from the RF tag and the respective selected antennas receiving each of the plurality of beacon symbols for each of the plurality of beacon nodes; estimating an angle-of-arrival (AoA) of the plurality of beacon symbols received at each of the plurality of beacon nodes; estimating AoA vectors of each of the plurality of beacon nodes from the AoA estimates; and estimating a spatial location of the RF tag from the AoA vectors.

According to a further embodiment of the method, each next one of the plurality of beacon symbols may be received at a next one of the cyclically selected antennas. According to a further embodiment of the method, every other next one of the plurality of beacon symbols may be received at a next one of the cyclically selected antennas. According to a further embodiment of the method, the plurality of beacon symbols may be payload portions of IEEE 802.15.4 standard compliant frames. According to a further embodiment of the method, the step of estimating the AoA of the plurality of beacon symbols received at each of the plurality of beacon nodes may comprise the step of determining the phase jump of each one of the plurality of beacon symbols in relation to a respective one of the cyclically selected antennas receiving the one of the plurality of beacon symbols from the RF tag.

According to a further embodiment of the method, the step of estimating the AoA of the plurality of beacon symbols received at each of the plurality of beacon nodes may comprise the step of determining the phase jump of every other one of the plurality of beacon symbols in relation to a respective one of the cyclically selected antennas receiving the every other one of the plurality of beacon symbols from the RF tag. According to a further embodiment of the method, the step of estimating the AoA may provide an azimuth angle estimation. According to a further embodiment of the method, the step of estimating the AoA may provide an elevation angle estimation.

According to a further embodiment of the method, the steps of calibrating position and orientation of each of the plurality of beacon nodes may further comprise: transmitting a plurality of beacon symbols from the cyclically selected antennas of a one of the plurality of beacon nodes; and receiving the plurality of beacon symbols on another one of the plurality of beacon nodes with a one of the antennas of the another one of the plurality of beacon nodes. According to a further embodiment of the method, the steps of calibrating position and orientation of each one of the plurality of beacon nodes may further comprise: transmitting a plurality of beacon symbols from a one of the antennas of a one of the plurality of beacon nodes; and receiving the plurality of beacon symbols on another one of the plurality of beacon nodes with the cyclically selected antennas of the another one of the plurality of beacon nodes. According to a further embodiment of the method, additional steps may comprise: providing a central processing node; and providing a network for coupled the central processing node to the plurality of beacon nodes.

According to a further embodiment of the method, each of the plurality of beacon nodes may comprise: a radio frequency (RF) device; an antenna switch coupled between the RF device and the cyclically selected antennas; and a digital processor having outputs that control the antenna switch and a trigger input coupled to the RF device, wherein when a switch antenna signal is received from the RF device the digital processor may cause the antenna switch to coupled the RF device to a different one of the antenna. According to a further embodiment of the method, the digital processor may be a microcontroller. According to a further embodiment of the method, the digital processor is selected from the group consisting of a microprocessor, a digital signal processor (DSP), a programmable logic array (PLA) and an application specific integrated circuit (ASIC).

BRIEF DESCRIPTION OF THE DRAWINGS

A more complete understanding of the present disclosure may be acquired by referring to the following description taken in conjunction with the accompanying drawings wherein.

Figure 1:
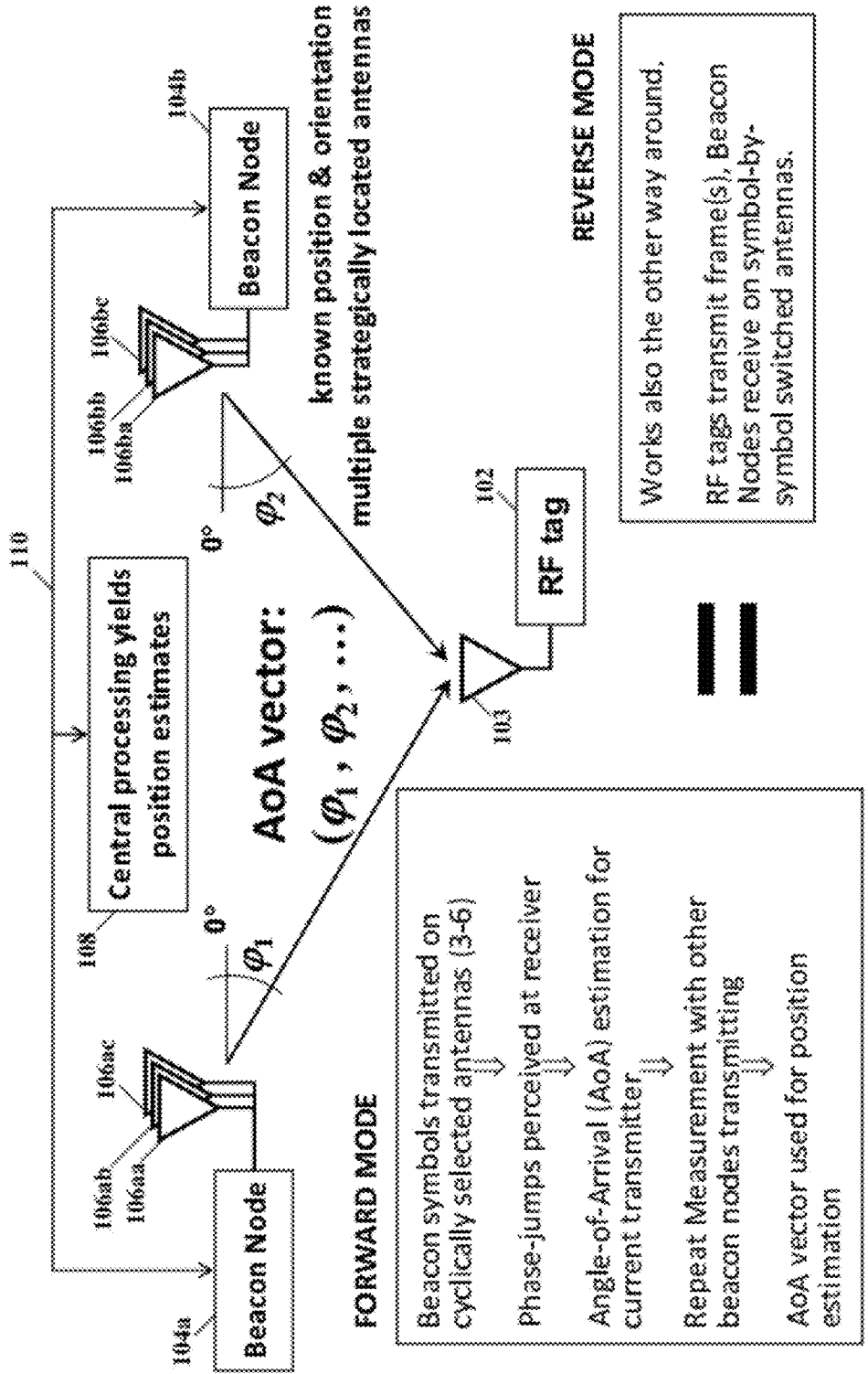
FIG. 1 illustrates a schematic diagram of a radio frequency tag (RF-tag) localization architecture, according to the teachings of this disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Asset tracking may be determined by the location and bearing of a RF-tag imbedded therein through extended radio frequency triangulation. A beacon arrangement determines the direction of a RF-tag from a specially designed beacon node. RF-tag localization is further improved by repeating this measurement from multiple spatially displaced beacon nodes. The beacon nodes are equipped with multiple strategically located antennas and transmit frames with each symbol cyclically switched to a different antenna. The symbols traveling different distances result in phase shifts within the frame received by the RF-tag. From the phase shifts and the known arrangements of the antennas, the angle at which the RF-tag is RF visible from the specific beacon node can be estimated. Determination of the signal phase shifts are part of the baseband processing hardware, the rest of the location determination procedure may be realized in software.

Effective RF-tag location also works in the reverse direction as well, the RF-tag transmits frames (using a single antenna) and the beacon nodes receive the signals from the RF-tag over the beacon nodes' symbol-by-symbol switched antennas. Both the forward and reverse directions may be used among the beacon nodes for calibrating their own position and orientation. This results in a better trade-off point between accuracy and resource intensity then conventional RF-tag location methods.

The cost and power constraints of an RF-tag require a relatively narrow RF bandwidth, which prohibits accurate estimation of time-of-flight or time-difference-of-arrival in determining locations of the RF-tags. Therefore, estimating the angle-of-arrival of radio frequency (RF) signals is preferred. Alternatively to position estimation, angle-of-arrival information can be applied directly in certain robot navigation applications. The solution can be applied with standard IEEE 802.15.4 compatible radios that can support this elementary measurement. When extended to a set of spatially separate beacon nodes, estimation of the asset RF-tag position through extended triangulation is facilitated.

A comparison of the present invention to other ways of locating RF-tag assets is summarized in the following table:

its respective antennas 106b. Then vectors derived from the AoA estimates of each of the respective transmitting beacon nodes 104 may be used for an estimation of the position of the RF-tag node 102.

In the reverse mode, beacon symbols are received on cyclically selected antennas 106, e.g., three to six antennas. The phase jumps between beacon symbols received at the different antennas 106a will be perceived (determined) with a receiver and decoder in the beacon node 104a. From these determined phase jumps of the different received symbols, an angle of arrival (AoA) estimation can be made for the transmitting RF-tag node 102 with the central processing node 108. The aforementioned steps are repeated with at least one other spatially different receiving beacon node 104b and its respective antennas 106b. Then vectors derived from the AoA estimates of the RF-tag node 102 from each of the respective

| Aspects | Present Invention | RSSI-based | TOF-based | TDOA-based |
|---|---|---|---|---|
| Band-width requirement | Low | Low | High | High |
| Consumption and Cost | Low | Lowest | High | High |
| Enhanced Synchronization | None | None | Required | None |
| Accuracy | Accurate angle (even through wall) | Accurate within a few meters | Accurate (bandwidth!) | Accurate (bandwidth!) |
| Location estimation resolution | linear degradation vs. distance | rapid degradation vs. distance | Constant resolution | Constant resolution |
| Multi-path robustness | Medium; degrades with the distance | Poor at long distances. | The higher the bandwidth and the shorter the range, the better the robustness can be. | |
| Techniques to mitigate multi-path effects | Frequency diversity; more beacons | Frequency diversity more beacons | Frequency diversity LOS signal detectability Non-negative additive errors assumed in the estimation | |

Referring now to the drawings, the details of a specific example embodiment is schematically illustrated. Like elements in the drawings will be represented by like numbers, and similar elements will be represented by like numbers with a different lower case letter suffix.

Referring to FIG. 1, depicted is a schematic diagram of a radio frequency tag (RF-tag) localization architecture, according to the teachings of this disclosure. Angle of arrival (AoA) estimation requires a single antenna 103 in each RF-tag node 102 and multiple, cyclically selected antennas 106 in the beacon nodes 104, as shown in FIG. 1. During measurement in a forward mode the RF-tag node(s) 102 is passive (listening) and at least one beacon node 104 is active (transmitting). During measurement in a reverse mode the RF-tag node(s) 102 is active (transmitting) and at least one beacon node 104 is passive (listening). The beacon nodes 104 are coupled to a central processing node 108 through a network 110. The network 110 and beacon nodes 104 utilizing the forward and/or reverse mode are scalable.

In the forward mode, beacon symbols are transmitted on cyclically selected antennas 106, e.g., three to six antennas. The phase jumps between beacon symbols transmitted from different antennas 106a will be perceived (determined) with a receiver and decoder in the RF-tag node 102. From these determined phase jumps of the different received symbols, an angle of arrival (AoA) estimation can be made for the transmitting beacon node 104a with the central processing node 108. The aforementioned steps are repeated with at least one other spatially different transmitting beacon node 104b and receiving beacon nodes 104 may then be used for an estimation of the position of the RF-tag node 102.

Figure 2:
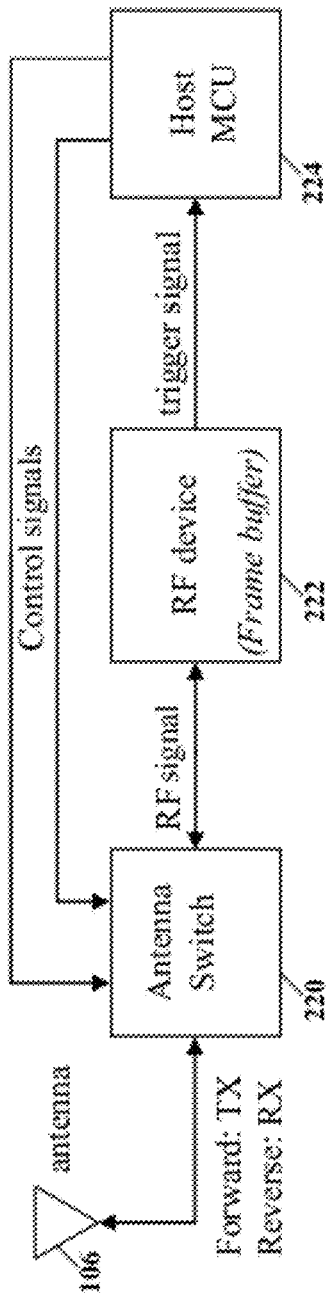
FIG. 2 illustrates a schematic block diagram of a beacon node architecture, according to a specific example embodiment of this disclosure.

Referring to FIG. 2, depicted is a schematic block diagram of a beacon node architecture, according to a specific example embodiment of this disclosure. Antennas 106 are switched with an antenna switch 220 in the beacon node 104 during beacon transmission in forward mode and during reception in reverse-mode. The TX/RX frame buffer(s) (not shown) may be located in either a microcontrol unit (MCU) 224 or a RF device 222 of the respective beacon node 104. The MCU 224 may use its control outputs to switching the antennas 106 since the RF device 222 may have a limited number of control outputs. Selection of the number and order of the antennas 106 may depend upon the spatial coverage requirements of the location application. The MCU 224 may be, for example but is not limited to, a microcontroller, a microprocessor, a digital signal processor (DSP), a programmable logic array (PLA) or an application specific integrated circuit (ASIC).

Commercially available off-the-shelf (COTS) antenna switches may allow arbitrary control output interfacing to the MCU 224. The antenna switching period may be within one or more symbol time durations. During a residual carrier offset estimation between the receive and transmit frequencies, antenna switching will be inhibited, e.g., masking triggers from a software program. The RF device 222 may provide timing pulses ("triggers") to the MCU 224 for when to switch the antennas 106, e.g., switching the antennas at symbol boundaries. The MCU 224 response latency may be accounted for, see FIG. 3. Software latency may be deterministic and will correspond to the hardware option selected.

Figure 3:
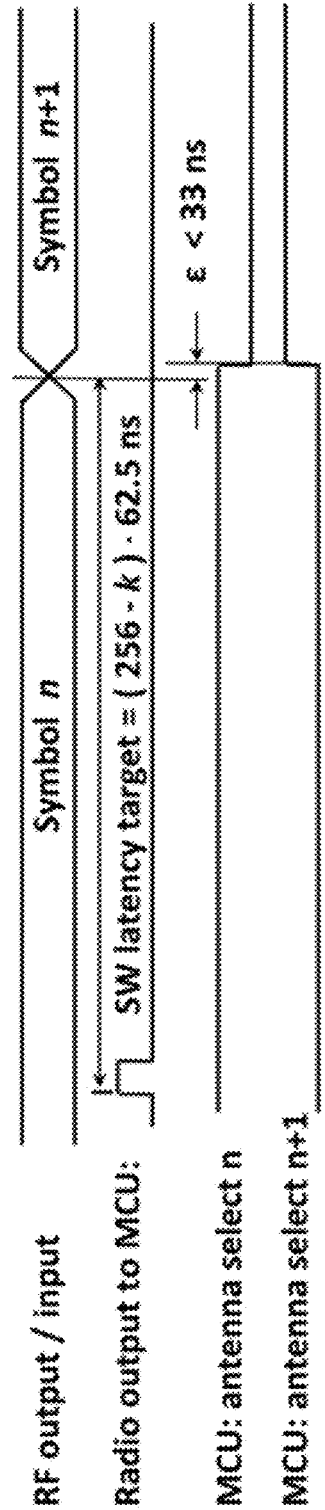
FIG. 3 illustrates schematic interface signal timing waveform diagrams of a beacon node, according to specific example embodiments of this disclosure.

Referring to FIG. 3, depicted is schematic interface signal timing waveform diagrams of a beacon node, according to specific example embodiments of this disclosure. An acceptable error may be in the order of 100 nanoseconds (ns), therefore sufficient granularity is provided for in the timing. A 62.5 ns timer resolution may be derived from an oscillator (not shown) having a 16 MHz frequency. A preferred maximum software latency target may be 16 μs, which may be a direct-sequence spread spectrum (DSSS) symbol length (or 4 bit durations at 250 kbps), where k may be software programmable.

In a coherent or a block-noncoherent offset quadrature phase-shift keying (OQPSK) receiver architecture, the received DSSS symbols in the IEEE 802.15.4 PHY payload are correlated against each of the 16 hypothetically expected ideal waveforms, and the received symbol is detected based on the greatest correlation magnitude. The symbol phase is available from the real and imaginary parts of the computed complex correlation as well.

The phase is obtained by converting the complex correlation to polar coordinates. To this end a coordinate rotation by digital computer (CORDIC) block, primarily required for the automatic frequency control (AFC) operation during preamble processing, may be reused. This is only a minor modification to the data path. During the AFC tracking operation, antenna stepping is inhibited.

Both the phase and the magnitude information may be available to the host-MCU 224 through, for example but not limited to, a SPI interface as a special function register, which may be updated on every new symbol. A SPI-read operation may be triggered by the event trigger signal provided by the RF device 222 to the MCU 224.

Figure 4:
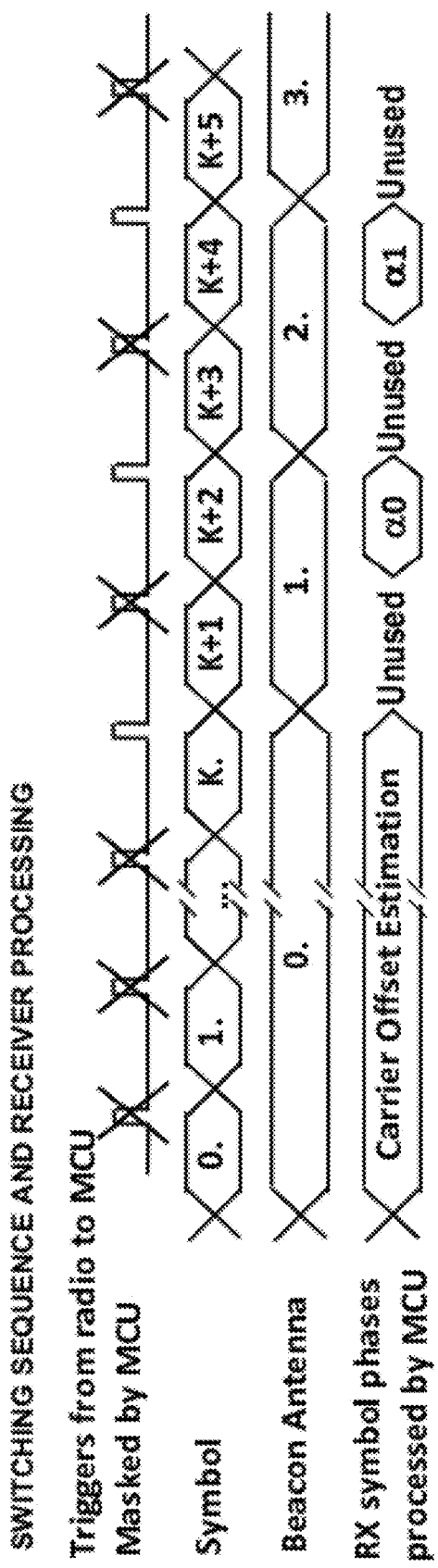
FIG. 4 illustrates schematic switching sequence and receiver processing signal timing waveform diagrams, according to the teachings of this disclosure.

Referring to FIG. 4, depicted are schematic switching sequence and receiver processing signal timing waveform diagrams, according to the teachings of this disclosure. Phase values are impaired by noise. The signal-to-noise ratio depends on the received signal strength and the level of interference from the medium. Therefore, multiple cycles of antenna switching may be required and the receiver may perform some form of averaging of the values from each antenna 106.

This operation has to take into account phase wrapping at multiples of 2π and the residual carrier offset between the transmitter and the receiver, as explained more fully hereinafter. Under low signal-to-noise conditions, the residual offset (after AFC determination has completed) can be as high as +/−3 parts-per-million (ppm). This needs to be estimated and compensated for in software computations, as explained more fully hereinafter, otherwise a possible wrap-over of the accumulated phase can pass undetected.

To estimate the residual carrier offset, the antennas 106 are not switched during the first few symbols, while the receiver accomplishes the AFC estimation. The switching triggers provided by the RF device 222 may be masked in software.

Inter-symbol-interference (ISI) may also be addressed. This is caused by the limited bandwidth of the analog receiver as well as by multi-path propagation of the RF signal. By switching the beacon antennas 106 on every other symbol boundary only, the receiver can discard the phase of the first symbol, which is corrupted by ISI from the previous antenna reception, and use the phase of the second symbol only. This establishes a selectable tradeoff between estimation accuracy versus measurement time (switching antennas on every symbol boundary).

Phase Wrap-Over

Let $(x)_{WRAP}$ denote the following operation:

$$(x)_{WRAP} = (x+\pi) \bmod 2\pi - \pi \qquad (1)$$

WRAP maps its argument to the $-\pi \ldots \pi$ [radians] interval. WRAP unavoidably occurs when a phase is measured. WRAP is equivalent to overflow in fixed-point computations using two's-complement arithmetic when the most significant bit represents $-\pi$:

$$\text{VALUE} = -\pi \cdot b_{W-1} + \frac{\pi}{2} \cdot b_{W-2} + \ldots + \frac{\pi}{2^{W-1}} b_0$$

where W is the bit width. Also, the same identities apply for WRAP as to overflow in fixed-point computations, (apart from the different validity range due to the $2\pi$ scaling):

$$(x)_{WRAP} = x \text{ if } -\pi \leq x \leq \pi \qquad (2)$$

Replacing x by an expression:

$$(x \pm y \pm \ldots \pm z)_{WRAP} = x \pm y \pm \ldots \pm z \text{ if } -\pi \leq x \pm y \pm \ldots \pm z \leq \pi \qquad (3)$$

The other identity is:

$$((x)_{WRAP} \pm y \pm \ldots \pm z)_{WRAP} = (x \pm y \pm \ldots \pm z)_{WRAP} \qquad (4)$$

which always holds, and can be applied repeatedly on any of the arguments. So, for example:

$$((x)_{WRAP} \pm (y)_{WRAP} \pm \ldots \pm (z)_{WRAP})_{WRAP} = (x \pm y \pm \ldots \pm z)_{WRAP} \qquad (5)$$

Note, however, that:

$$(C \cdot (x)_{WRAP} \pm y \pm \ldots \pm z)_{WRAP} \neq (C \cdot x \pm y \pm \ldots \pm z)_{WRAP} \qquad (4b)$$

unless $C \cdot x - C \cdot (x)_{WRAP}$ is an integer multiple of $2\pi$.

Un-Wrapping an Expression

To unwrap an arbitrary expression $(x)_{WRAP}$, the expression may be extended in the following format:

$$(x - \hat{x})_{WRAP} + \hat{x} = x - \hat{x} + \hat{x} = x \text{ if } -\pi \leq x - \hat{x} \leq \pi \qquad (6)$$

where $\hat{x}$ is an a prior estimate of the value, such that the error of the estimation $x - \hat{x}$ fulfills the criteria for invariability vs. WRAP.

Spatial Model Parameters

Figure 4A:
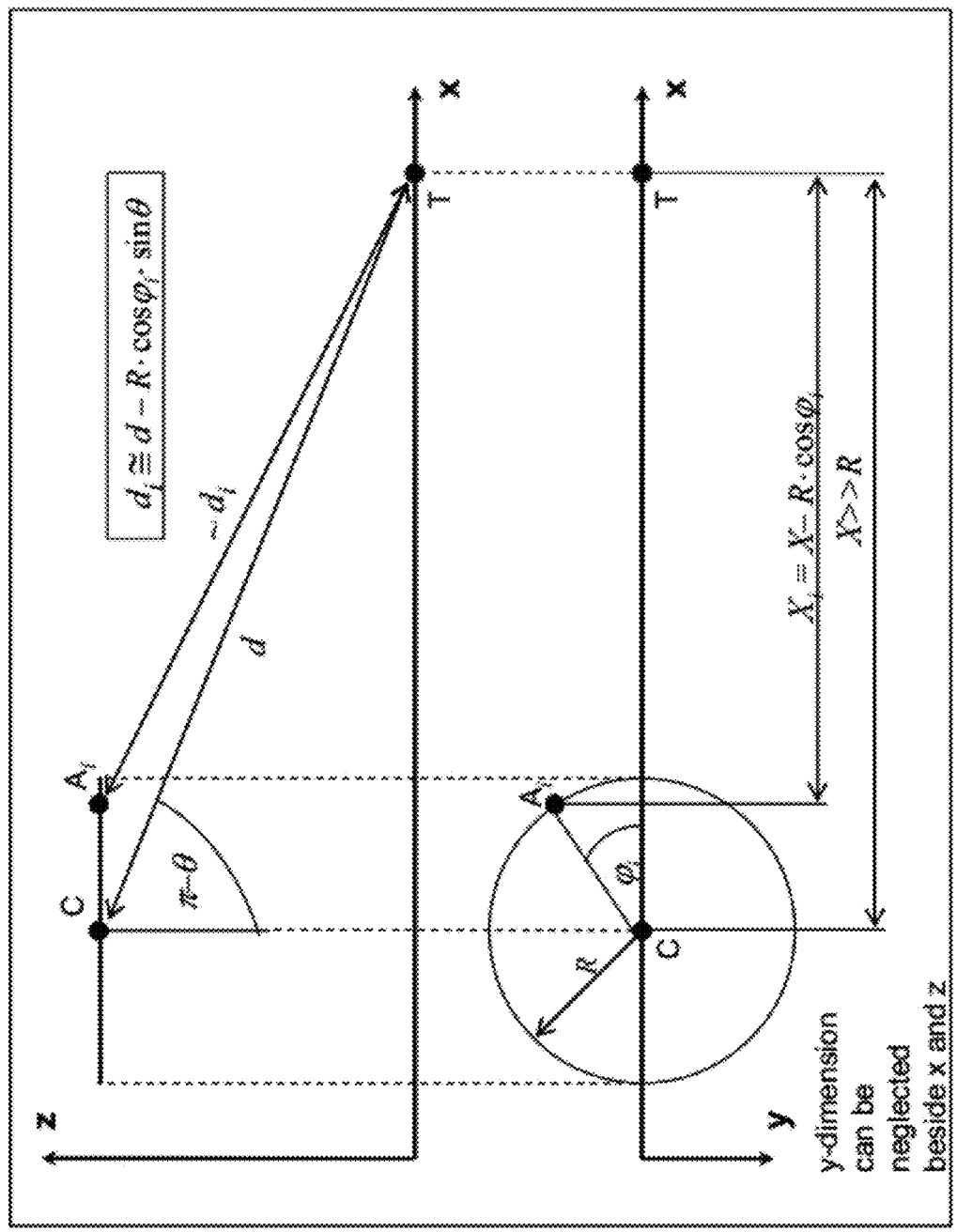
FIG. 4A illustrates schematic plan and elevational views of beacon node antennas in spatial (three dimensional) relation to a RF-tag antenna, according to the teachings of this disclosure.

Referring to FIG. 4A, depicted are schematic plan and elevational views of beacon node antennas in spatial (three dimensional—3-D) relation to a RF-tag antenna, according to the teachings of this disclosure. It is assumed that the 3-D position of antennas can be represented by points and the multiple antennas of the beacon node are located on a circle. Three points are defined:

T represents the position of the RF tag antenna.

$A_i$ represents the position ith antenna of the beacon node

C is the center of the circle that holds the position of all the beacon node antennas These are depicted using the following two planes for projection:

X-Y is the plane that holds all the beacon node antennas.

X-Z is the plane that holds C and T, and is perpendicular to X-Y.

Distances:

R is the radius of the circle that holds the beacon antenna locations d is the distance between C and T (d>>R)

x is the distance between the images of C and T when projected to the X-plane (X>>R)

$X_i$, $Y_i$ and $Z_i$ are the distances measured between the images of T and $A_i$ when being projected onto the X, Y and Z axes, respectively.

$d_i$ is the distance between T and $A_i$

The distance between the X-Y plane images of $A_i$ and T is $\sqrt{X_i^2+Y_i^2}$ and can be approximated by $X_i$. In general, since R<<X and R<<d, distances along the y-dimension may be neglected in all of the approximations.

The azimuth angle $\phi_i$ and elevation angle $\theta$ define the bearing of T with respect to the vector connecting C and $A_i$ (for all i). Angle of Arrival (AoA) is defined as $\phi_0$, that is the azimuth angle with respect to the $0^{th}$ antenna. Using these angles:

$$x_i = x - R \cdot \cos \phi_i$$

$$d_i \approx d - R \cdot \cos \phi_i \cdot \sin \theta$$

In the two-dimensional case, the $\theta = \pi/2$ thus $d_i = d - R \cdot \cos \phi_i$. Assuming two beacon antennas at opposite points of the circle, $\cos \phi_j = -\cos \phi_i$. Also, the difference in the distances to the tag T becomes:

$$d_j - d_i \approx 2 \cdot R \cdot \cos \phi_i \cdot \sin \theta$$

or equivalently: $(d_i - d_j) = (x_i - x_j) \cdot \sin \theta$

Angle of Arrival Estimation

Angle of arrival (AoA) estimation may be accomplished in software. Although a few multiplication and division operations per frame are necessary, only fixed-point additions are required per symbol. This ensures that the AoA estimation can be accomplished in real-time (e.g., without additional buffering) with an 8-bit MCU.

First Principles

Figure 5:
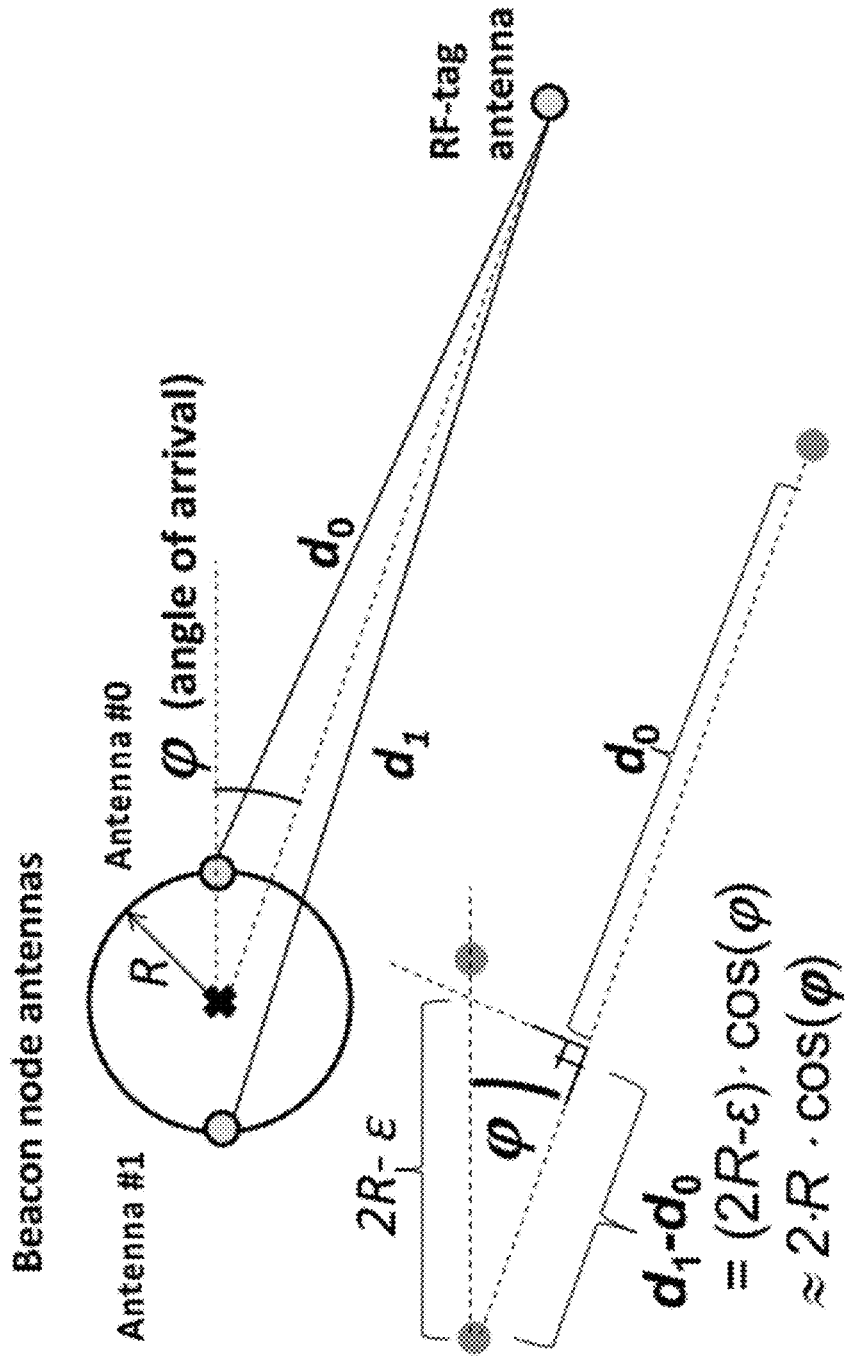
FIG. 5 illustrates a schematic plan view of two beacon node antennas in relation to a RF-tag antenna, according to the teachings of this disclosure.

Referring now to FIG. 5, depicted is a schematic plan view of two beacon node antennas in relation to a RF-tag antenna, according to the teachings of this disclosure. Ideally, the following relationship needs to be exploited in a two (2) dimensional scenario assuming no signal impairments or perfect synchronization between the transmitter and the receiver:

$$\alpha_{i\,IDEAL} = \left(2\pi \frac{d_i}{\lambda}\right)_{WRAP} ; \lambda = \text{carrier wavelength} \quad (7)$$

Where $\alpha_i$ is the phase shift of the received symbol with respect to the transmitted one when the $i^{th}$ beacon antenna is selected, and $d_i$ is the distance between the selected antenna and the RF tag antenna. Unless $d_i < \lambda/2$, the expression cannot be unwrapped using equation (2). To apply equation (2), the difference is taken:

$$\Delta \alpha_{i,j\,IDEAL} = \alpha_{i\,IDEAL} - \alpha_{j\,IDEAL} = \left(2\pi \frac{d_i - d_j}{\lambda}\right)_{WRAP} \quad (8)$$

Note: the identity of equation (5) has been applied in the second equality of equation (8). If $|d_i - d_j| < \lambda/2$ then equation (8) can be unwrapped, yielding:

$$d_i - d_j = \frac{\Delta \alpha_{i,j\,IDEAL}}{2\pi} \cdot \lambda \quad (9)$$

In the asymptotical case, when $d_i$ and $d_j$ are much larger than $|d_i - d_j|$, the angle $\phi$ shown in FIG. 5 can be estimated as:

$$\hat{\varphi} = \arccos\left(\frac{d_1 - d_0}{2 \cdot R}\right) \quad (10)$$

As will be shown hereinafter, the error of this approximation does not restrict the accuracy of the location estimation.

Non-Idealities

Reality is better approximated by the following relationship:

$$\alpha_{i,n} = \left(2\pi \cdot \frac{d_i}{\lambda} + \xi_n + \Omega \cdot n + \gamma + \beta_i(d, \varphi, \theta)\right)_{WRAP} \quad (11)$$

where n=−K−1, . . . , 0, 1, . . . , N−1 is the symbol index, K+1 and N denoting the number of symbols used for residual carrier offset estimation and phase measurement, respectively.

i=0, 1, . . . , I−1 is the antenna index, which is entirely defined by n, that is: $i = i_n$ $d_i$ is the distance between the RF-tag antenna and the i-th beacon antenna.

$\xi_n$ denotes a random additive noise that is considered to be independent over n and Gaussian-distributed $\Omega$ is the angular rotation over each symbol period caused by the residual carrier offset that remains after AFC compensation $\gamma$ is a random phase offset that is constant over n and i within a frame. It is the lumped contribution of initial phase offset between the transmitter and receiver PLL, the group delay of analog and digital processing, etc.

$\beta_i$ is a systematic phase offset that is constant in time but different for each antenna (i). It is a function of the location parameters to be estimated (d,φ,θ). $\beta_i - \beta_j \approx 0$ can be assumed if d>>λ as shown later.

Note: WRAP inside the parentheses are omitted due to using equation (4).

Noise Reduction Task

Let the averaged phase value be defined as $$\overline{\alpha}_i = \left(2\pi \cdot \frac{d_i}{\lambda} + \overline{\xi}_i + \gamma'(\Omega) + \beta_i(d, \varphi, \theta)\right)_{WRAP} \quad (12)$$

where $$\gamma'(\Omega) = \gamma + \sum_{n=0}^{N-1} \Omega \cdot n = \gamma + \Omega \cdot \frac{(N-1)N}{2}$$

is a random phase offset that is independent from i and n.

$$\overline{\xi}_i = \frac{1}{N} \sum_{n=0}^{N-1} \xi_n << \pi$$

is the averaged noise.

The difference of the averaged phase is taken between antennas i and j and (5) is applied:

$$\Delta\bar{\alpha}_{i,j} = \bar{\alpha}_i - \bar{\alpha}_j = \left(2\pi\frac{(d_i - d_j)}{\lambda} + \bar{\xi}_i - \bar{\xi}_j + \Delta\beta_{i,j}\right)_{WRAP} \quad (13)$$

The expression can be unwrapped if equation (2) applies, i.e., $$\Delta\bar{\alpha}_{i,j} = 2\pi\frac{(d_i - d_j)}{\lambda} + \bar{\xi}_i - \bar{\xi}_j + \Delta\beta_{i,j} \text{ if} \quad (14)$$

$$\left|2\pi\frac{(d_i - d_j)}{\lambda} + \bar{\xi}_i - \bar{\xi}_j + \Delta\beta_{i,j}\right| < \pi$$

The major difference between equations (11) and (12) is that the additive noise term gets reduced ($|\bar{\xi}_i| \ll \pi$), which is necessary for unwrapping the phase difference as shown in equation (14). (Note that $|\Delta\beta_{i,j}| \ll \pi$ is also required, but this will be addressed hereinafter.)

Therefore, the primary task in software is to compute $\bar{\alpha}_i$ from the sequence of $\alpha_{i,n}$'s. Will the simple averaging work? To answer that question, equation (12) is rewritten as:

$$\bar{\alpha}_i = \left(\sum_{n=0}^{N-1}\frac{1}{N}\cdot\left(2\pi\cdot\frac{d_i}{\lambda} + \xi_{i,n} + \Omega\cdot n + \gamma + \beta_i(d, \varphi, \theta)\right)\right)_{WRAP} \quad (15)$$

If the expression enclosed by the inner parentheses could be replaced by its wrapped expression, i.e., $\alpha_{i,n}$ according to equation (11), then the answer would be in the positive. However, due to equation (4b) this identity does not hold. The alternative solution is to "unwrap" the expression in equation (11) (following the pattern in equation (6)) to obtain:

$$\hat{\alpha}_{i,n} = 2\pi\cdot\frac{d_i}{\lambda} + \xi_n + \Omega\cdot n + \gamma'' + \beta_i(d, \varphi, \theta) \quad (16)$$

where $\gamma'' = \gamma + $ arbitrary constant is a random phase offset that is constant over n and i. Note that it gets canceled in equation (13).

The unwrapping can be attempted by the following computation:

$$\hat{\alpha}_{i,n} = \begin{cases} \alpha_{i,n} & \text{if } n < P \\ (\hat{\alpha}_{i,n} - \hat{\alpha}_{i,n-P})_{WRAP} + \hat{\alpha}_{i,n-P} \\ = (\alpha_{i,n} - \alpha_{i,n-P})_{WRAP} + \hat{\alpha}_{i,n-P} & \text{otherwise} \end{cases} \quad (17)$$

where P denotes the period of the cyclic antenna switching expressed in the number of symbols. To be successful, the following criteria should be met:

$$|\hat{\alpha}_{i,n} - \hat{\alpha}_{i,n-P}| = |\xi_{i,n} - \xi_{j,n}\Omega\cdot P| < \pi \quad (18)$$

Under low signal to noise conditions, $|P\cdot\Omega| < \pi$ will not be guaranteed to hold, causing an unpredictable wrap over in equation (18). Therefore, equation (17) is modified as:

$$\hat{\alpha}_{i,n} = \begin{cases} \alpha_{i,n} & \text{if } n < P \\ (\hat{\alpha}_{i,n} - \hat{\alpha}_{i,n-P} + \hat{\Omega}\cdot P)_{WRAP} + \hat{\alpha}_{i,n-P} - \hat{\Omega}\cdot P & \text{otherwise} \\ = (\alpha_{i,n} - \alpha_{i,n-P} + \hat{\Omega}\cdot P)_{WRAP} + \hat{\alpha}_{i,n-P} - \hat{\Omega}\cdot P \end{cases} \quad (19)$$

where $\hat{\Omega}$ is an estimate of $\Omega$.
The criteria for the estimation accuracy is that:

$$|\hat{\alpha}_{i,n} - \hat{\alpha}_{i,n-P}| = |\xi_{i,n} - \xi_{j,n} + (\Omega - \hat{\Omega})\cdot P| < \pi \quad (20)$$

If equation (20) is met then equation (19) can be used to unwrap equation (11), yielding equation (16). Equation (15) is derived from equation (16) by simple averaging over n and wrapping the result. Equation (12) is therefore the same as equation (15).

Residual Carrier Offset Estimation

A first step implements an estimation for $\hat{\Omega}$ that ensures equation (20). It can be assumed that the AFC operation has completed during the preamble portion of the frame and uses the estimated carrier frequency offset for the transmitter and the receiver for compensation during the payload portion of the frame. It is also a valid assumption that successful frame acquisition implies $|\Omega| \ll \pi$.

The first K+1 symbols of the payload (indexed $-K/2, \ldots, K/2$) are used for carrier offset estimation. Antennas are not switched, i.e., i is constant. Assuming K even, the least-squares estimator is:

$$\hat{\Omega}_{LS} = \frac{1}{K\cdot(K/2+1)}\cdot\sum_{k=-K/2}^{K/2}\text{sign}(k)\cdot\hat{\alpha}_{i,k} \quad (21)$$

where $\hat{\alpha}_{i,k}$ is obtained by applying equation (17) with P=1 and n=k+K/2, since $|\Omega| \ll \pi$ can be assumed. For high signal-to-noise ratio (SNR), $\Omega$ is so small that equation (18) might be satisfied thus $\hat{\Omega}=0$ is acceptable and K=0. For SNR around the sensitivity point of 1% PER, P/3<=K<=P/2 is a convenient choice, where P denotes one full cycle period of the antenna switching. For instance, for K=4, equation (21) can be evaluated as:

$$\hat{\Omega}_{approx} = \frac{5}{32}\cdot(-\hat{\alpha}_{i,-2} - \hat{\alpha}_{i,-1} + \hat{\alpha}_{i,1} + \hat{\alpha}_{i,2}) \quad (22)$$

where ⅙ has been approximated by 5/32 (i.e., with 6% error) to replace division by multiplication, thereby reducing the complexity.

Phase Accumulation

In a second step $\bar{\alpha}_i$ is computed as defined in equation (12), which contains reduced noise. For the iteration described in equation (19), the $\alpha_{i,n}$ phase values corresponding to each antenna must be retained for one cycle period (P). An accumulator is assigned for each antenna (i), and is updated on every $P^{th}$ cycle according to:

$$\bar{\alpha}_{i,n} = \begin{cases} \hat{\alpha}_{i,n} & \text{if } n < P \\ \bar{\alpha}_{i,n} + \hat{\alpha}_{i,n} & \text{if } n \bmod P = i \\ \bar{\alpha}_{i,n} & \text{otherwise} \end{cases} \quad (23)$$

After N sample being accumulated per each antenna i, equation (16) is obtained as:

$$\overline{\alpha}_i = \frac{1}{N}\overline{\alpha}_{i,N} \quad (24)$$

By convenience, N can be selected to be a power of two, so that division consists of translating the fractional point.

Phase Difference Estimation

A third step consists of evaluating equations (13) and (14) to obtain the matrix of $\Delta\overline{\alpha}_{i,j}$ values. The criteria of $|\Delta\beta_{i,j}|<<\pi$ is not restrictive in equation (14), because a fourth step defines a more restrictive criteria. For equation (14) to hold the following criteria must be met:

$$\left|2\pi\frac{(d_i - d_j)}{\lambda} + \overline{\xi}_i - \overline{\xi}_j + \Delta\beta_{i,j}\right| < \pi \quad (25)$$

Assume that the antennas are distributed evenly on a circle. Originally, equation (25) must hold for any two antennas i and j. Thus the diameter D of the square has to be less than $\lambda/2$. $\lambda/2 - D$ is the headroom left for the terms representing the non-idealities. Under certain conditions, there are ways to increase the headroom and/or the diameter of the circle. For instance, if the AoA can be restricted to a sub-interval of $-\pi \ldots \pi$ it or if the elevation ($\theta$) is known.

Change Detection

Assume that an estimate for AoA is available from a previous measurement round, as well as the matrix of $\Delta\overline{\alpha}_{i,j}$ phase differences that were used for the estimation. If the elements of the current matrix do not differ significantly from the stored ones (the comparison is performed taking the differences followed by WRAP), then the AoA estimation can be cancelled, keeping the previous estimate and the previously stored $\Delta\overline{\alpha}_{i,j}$ matrix.

Angle Computation

Figure 6:
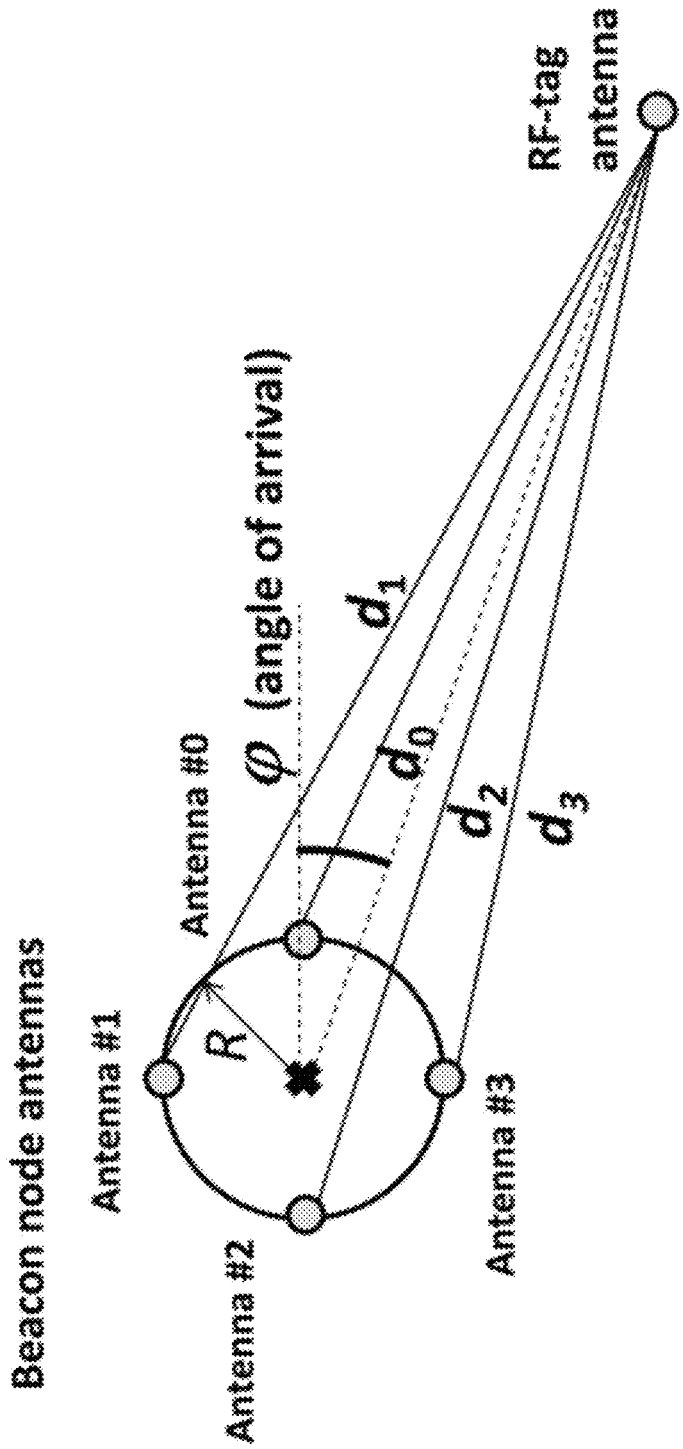
FIG. 6 illustrates a schematic plan view of four beacon node antennas in relation to a RF-tag antenna, according to the teachings of this disclosure.

Referring to FIG. 6, depicted is a schematic plan view of four beacon node antennas in relation to a RF-tag antenna, according to the teachings of this disclosure. From step four, the task is to estimate $\phi$ from the matrix of $\Delta\overline{\alpha}_{i,j}$. This task requires specifying the antenna arrangement in the beacon node and the antenna characteristics. A solution is given for the arrangement where four antennas are distributed evenly around a circle. The radius of the circle has to be less than $\lambda/4$ as explained in step three hereinabove. Distance will be scaled on the unity defined by the radius R of the circle. Thus the four antennas are located in the four corners of a square having a diagonal length of 2. A solution is shown for a 2-dimensional case first, then will be extended to "quasi 3-dimensions" applicable for moderate elevations (e.g., $|\sin(\theta)|>0.5$) with careful antenna design.

2-D Scenario

In a 2-dimensional case, $\sin(\theta)=1$ and by assuming an isotropic antenna characteristic in the relevant plane $\Delta\beta_{i,j}=0$. Thus, equation (14) becomes:

$$\Delta\overline{\alpha}_{i,j} = 2\pi\frac{\Delta d_{i,j}}{\lambda} + \overline{\xi}_i - \overline{\xi}_j \approx 2\pi\frac{\Delta d_{i,j}}{\lambda} \quad (26)$$

where $\Delta d_{i,j}=d_i-d_j$, i.e., the measured difference of the distance of the j th antenna to the RF tag and the i th antenna to the RF tag, i, j=0, . . . , 3. Amongst the possible (i,j) combinations, only $\Delta d_{0,2}$ $\Delta d_{1,3}$ are evaluated from equation (26). Equivalently, equation (33) may be used as shown hereinafter.

When $\Delta d_{0,2}$ $\Delta d_{1,3}$ are available, the following conditions are evaluated:

$$C0 \text{ is true if } \Delta d_{0,2}+\Delta d_{1,3}>=0 \quad (27a)$$

$$C1 \text{ is true if } \Delta d_{0,2}-\Delta d_{1,3}>=0 \quad (27b)$$

These are used for selecting one of the conditional branches below:

$$\hat{\varphi} = \begin{cases} \pi - \varphi_{1,3} & \overline{C0} \ \& \ \overline{C1} \quad \text{(case 1)} \\ -\varphi_{0,2} & \overline{C0} \ \& \ C1 \quad \text{(case 2)} \\ \varphi_{1,3} & C0 \ \& \ C1 \quad \text{(case 3)} \\ \varphi_{0,2} & \text{otherwise} \quad \text{(case 4)} \end{cases} \quad (28)$$

All the branches require evaluating either of the following two equations:

$$\phi_{0,2}=\arccos(\Delta d_{0,2}/(2R)) \quad (29/a)$$

$$\phi_{1,3}=\arccos(\Delta d_{1,3}/(2R)) \quad (29/b)$$

By scaling the argument to become the unity, and equation (29) can be computed by using a CORDIC. The computations can be simplified, by approximating $\Delta d_{0,2}$, $\Delta d_{1,3}$ for the evaluation of equation (27), and refining only one of them, as needed in equations (28) and (29). This is allowed, because the domain of applicability of the conditional expressions in equation (28) is overlapped by 50%. Moderate errors in the evaluation of equation (27) yield graceful degradation in equation (28). It is also noted that $\Delta d_{0,2}$, $\Delta d_{1,3}$ can be replaced by arbitrarily scaled estimates in equation (27) while the scaling is common for both values.

Figure 7:
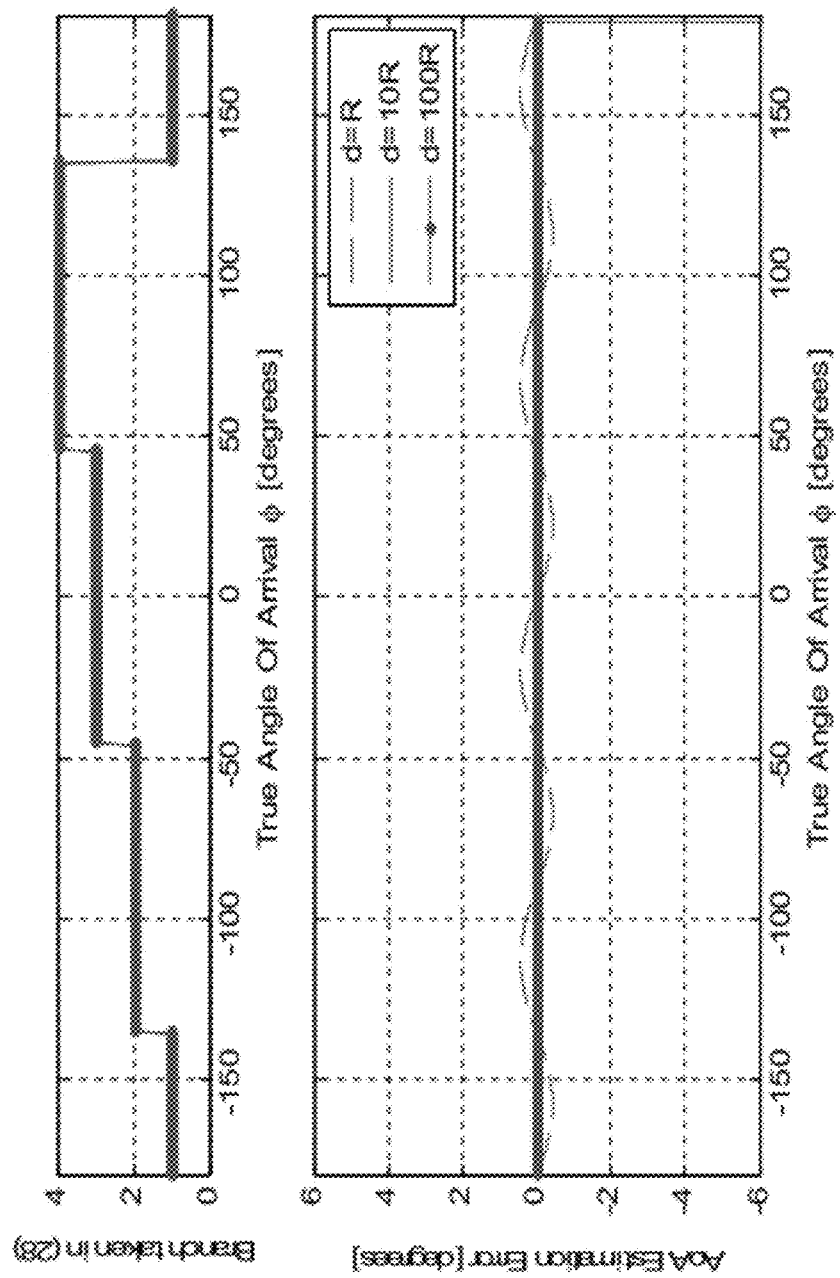
FIG. 7 illustrates schematic graphs of a systematic error of estimation, according to the teachings of this disclosure.

Referring to FIG. 7, depicted are schematic graphs of a systematic error of estimation, according to the teachings of this disclosure. FIG. 7 shows the case when equation (27) is evaluated as a function of the true Angle of Arrival, $\phi$, and the systematic error of equation (27) for various values of d: the distance from the center of the circle to the RF-tag antenna.

Figure 8:
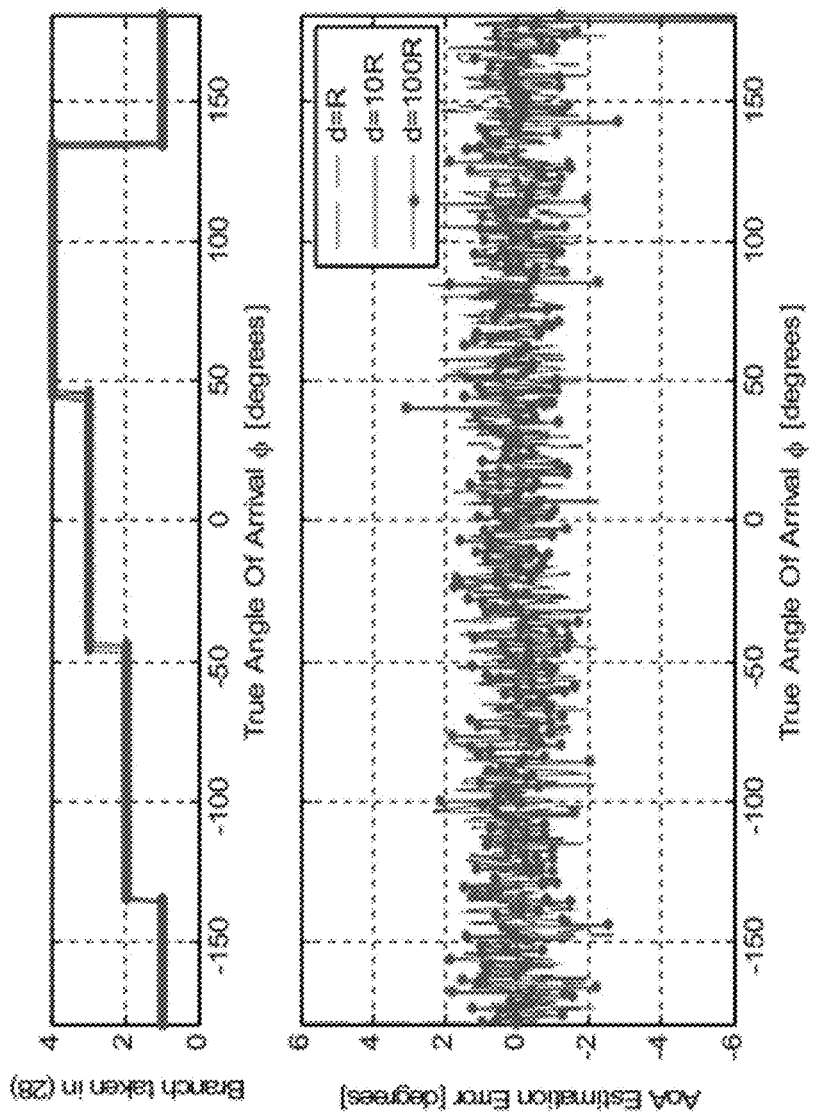
FIG. 8 illustrates schematic graphs of a stochastic error of estimation, according to the teachings of this disclosure.

Referring to FIG. 8, depicted are schematic graphs of a stochastic error of estimation, according to the teachings of this disclosure. FIG. 8 shows the stochastic error when the terms symbolizing noise in equation (26): $\overline{\xi}_i, \overline{\xi}_j$ are independently and identically distributed Gaussian random variables with standard deviation of 0.03 radian and assuming $\lambda=4R$. The standard deviation of the measured angle is 0.9 degree independently from each value of d.

Figure 9:
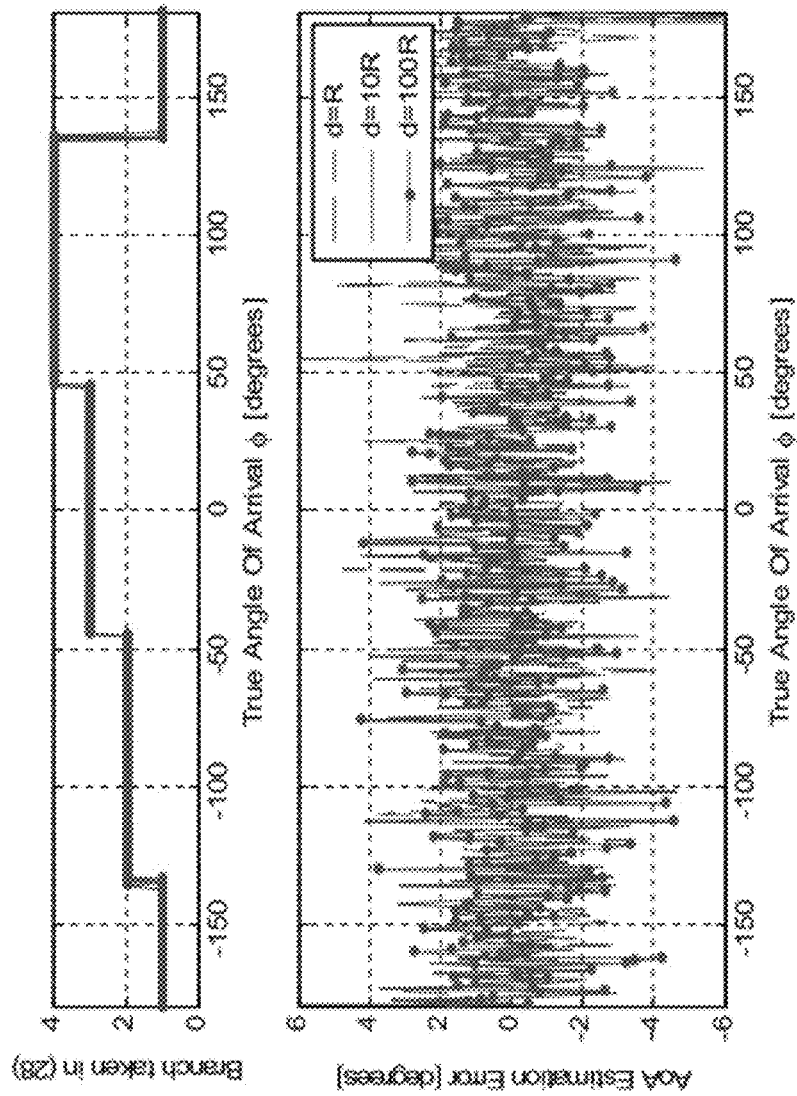
FIG. 9 illustrates schematic graphs of another stochastic error of estimation, according to the teachings of this disclosure.

Referring to FIG. 9, depicted are schematic graphs of another stochastic error of estimation, according to the teachings of this disclosure. FIG. 9 shows the stochastic error when the noise is increased. FIG. 9 also shows the stochastic error of the estimation in equation (27) when the standard deviation of $\overline{\xi}_i, \overline{\xi}_j$ is 0.06 radian. The resulting standard deviations is cca. 1.7 degrees for each value of d. By comparing FIG. 8 and FIG. 9, a fairly linear relationship is observed between the noise on the inputs and the noise on the resulting estimate.

Extension to Quasi 3-D Scenario

Figure 10:
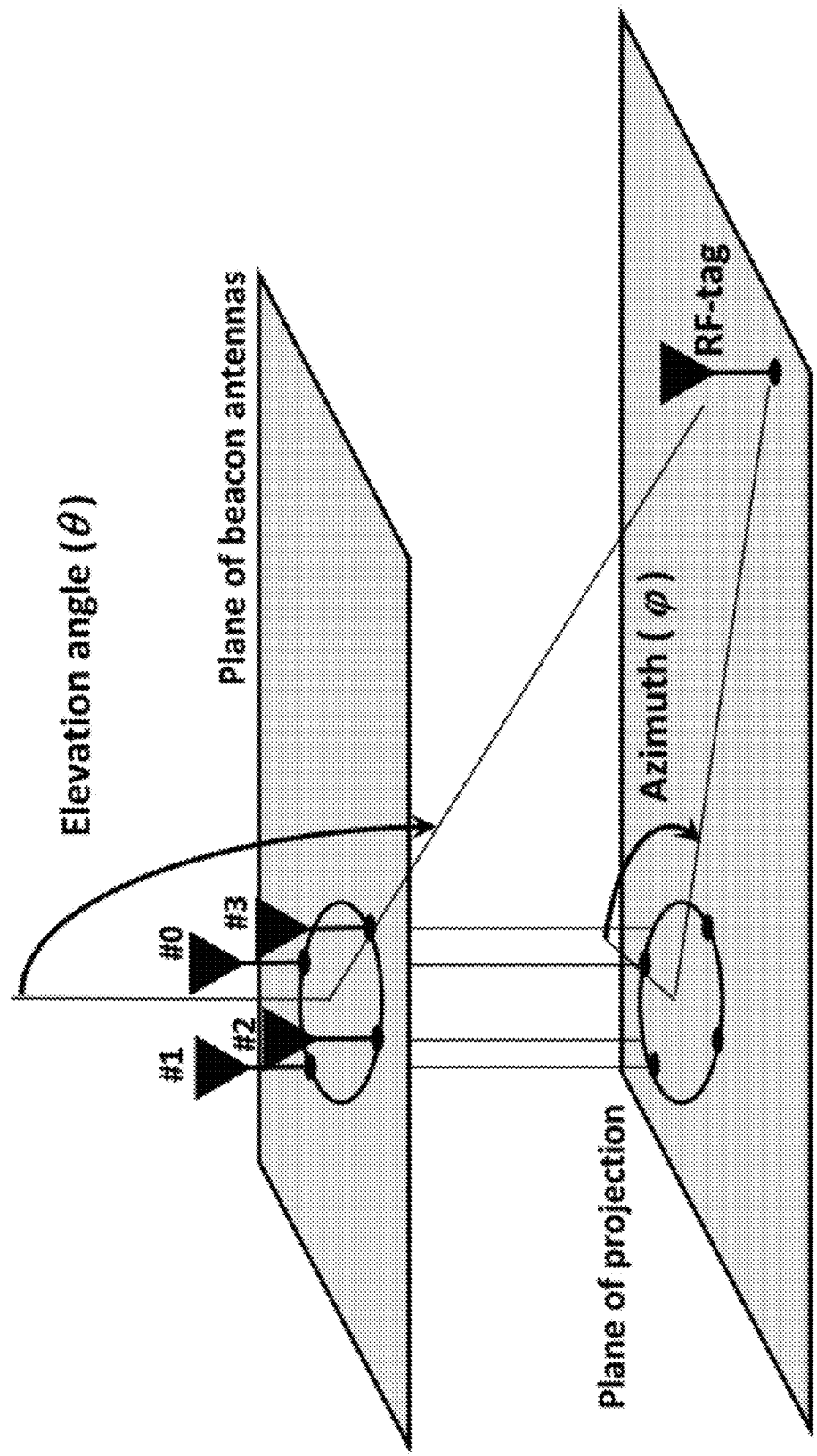
FIG. 10 illustrates a schematic isometric three dimensional diagram of an arrangement of four beacon antennas on a first plane and a RF-tag antenna on a second plane, according to the teachings of this disclosure.

Referring to FIG. 10, depicted is a schematic isometric three dimensional diagram of an arrangement of four beacon antennas on a first plane and a RF-tag antenna on a second plane, according to the teachings of this disclosure. In the 3-D scenario, the elevation and the antenna characteristics cannot be ignored. For convenience, equation (14) is repeated here using the replacement $(d_i - d_j) = (x_i - x_j) \cdot \sin\theta$:

$$\Delta \overline{\alpha}_{i,j} = 2\pi \frac{(x_i - x_j) \cdot \sin\theta}{\lambda} + \overline{\xi}_i - \overline{\xi}_j + \Delta\beta_{i,j} \tag{14b}$$

In the 3-D case the position of the i-th beacon antenna is projected onto the 2-dimensional plane that contains the RF tag and is parallel to the plane defined by the beacon antennas ("projection plane"). Then $x_i$ denotes the distance between the obtained image and the RF-tag.

First, the impact of the elevation ($\sin(\theta)$) is analyzed, whereas $\Delta\beta_{i,j} \approx 0$ is assumed, which shall be examined subsequently. The solution is sought for:

$$\Delta \overline{\alpha}_{i,j} \approx 2\pi \frac{(x_i - x_j) \cdot \sin\theta}{\lambda} \tag{30}$$

In the "projection plane" where $d_i$, $d_j$ are defined, the following hold:

$$(\Delta x_{0,2}^2 + \Delta x_{1,3}^2) = 4R^2 \tag{31}$$

Thus, $\sin\theta$ can be estimated as:

$$\sin\hat{\theta} = \frac{\lambda}{2\pi \cdot 2R} \cdot \sqrt{(\Delta\overline{\alpha}_{0,2}^2 + \Delta\overline{\alpha}_{1,3}^2)} \Big|_{\lambda = 4R} = \frac{1}{\pi} \cdot \sqrt{(\Delta\overline{\alpha}_{0,2}^2 + \Delta\overline{\alpha}_{1,3}^2)} \tag{32}$$

The elevation angle can be computed from equation (32) by evaluating arcsin using the CORDIC algorithm. Replacing $\sin(\theta)$ in equation (30) by the first equality in equation (32) yields:

$$\Delta \overline{\alpha}_{i,j} \approx \frac{(x_i - x_j)}{2R} \cdot \sqrt{(\Delta\overline{\alpha}_{0,2}^2 + \Delta\overline{\alpha}_{1,3}^2)} \tag{33}$$

when $$R = \lambda/4$$

This is solved for $\Delta x_{0,2}$ and $\Delta x_{1,3}$. Finally, $\Delta x_{0,2}$ and $\Delta x_{1,3}$ are used to formally replace $\Delta d_{0,2}$ and $\Delta d_{1,3}$ in equations (27) through (29), which are used to estimate the azimuth angle $\phi$.

Antenna Characteristics

Although the antenna cannot be considered to be perfectly isotropic in 3-D, for moderate elevation angle and large distances ($d_i >> \lambda$), it can be assumed that any two antennas i and j see the RF tag under only slightly different angles so they introduce roughly the same phase offset, hence $\Delta\beta_{i,j} \approx 0$. The residual effect can be corrected for by estimating $\theta$ first, then estimating $\Delta\beta_{i,j}$ based on a look-up table, and finally using the estimated phase difference error $\Delta\beta_{i,j}$ for compensation in $\Delta d_{0,2}$ $\Delta d_{1,3}$ according to equation (14). The estimates can be refined through iterations in alternation. Monotonic antenna characteristics are required within the feasible interval of $\theta$. The dependence of $\Delta\beta_{i,j}$ on the distance (d) can be ignored for $d >> \lambda$.

Figure 11:
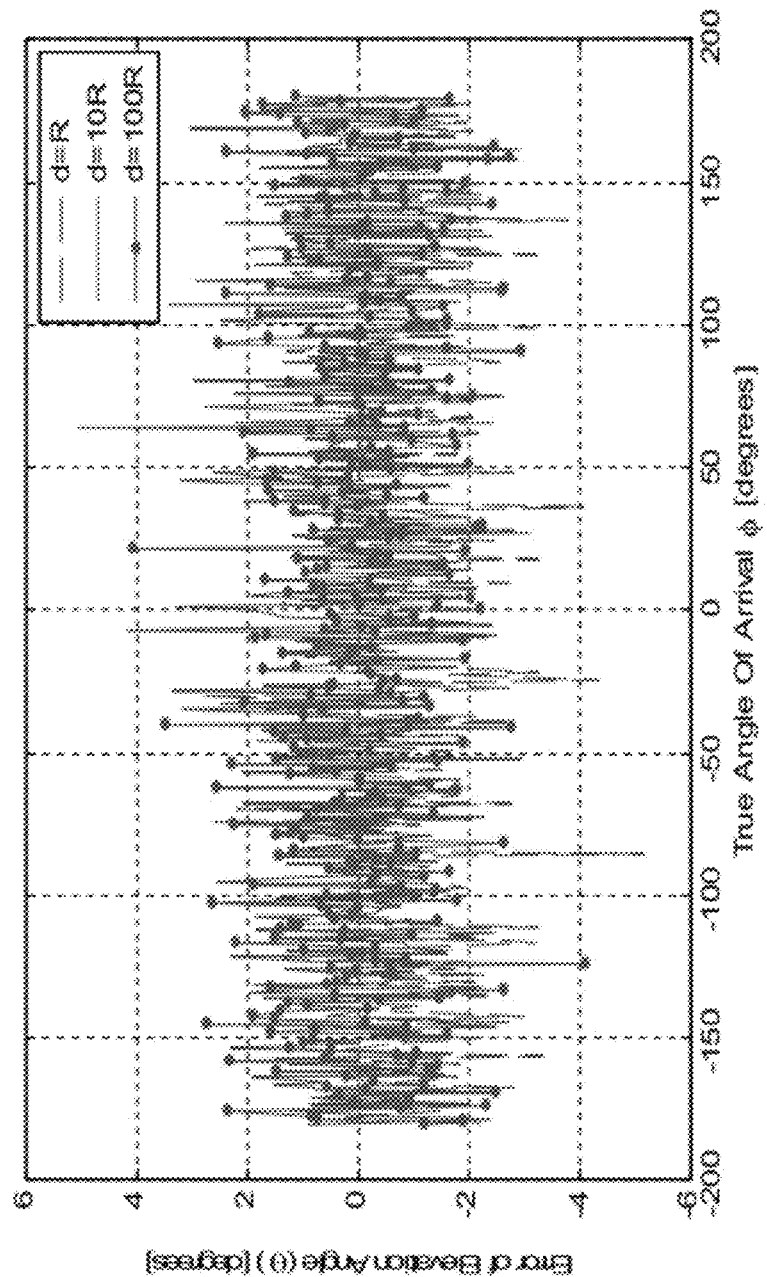
FIG. 11 illustrates a schematic graph of another stochastic error of estimation, according to the teachings of this disclosure.
Figure 12A:
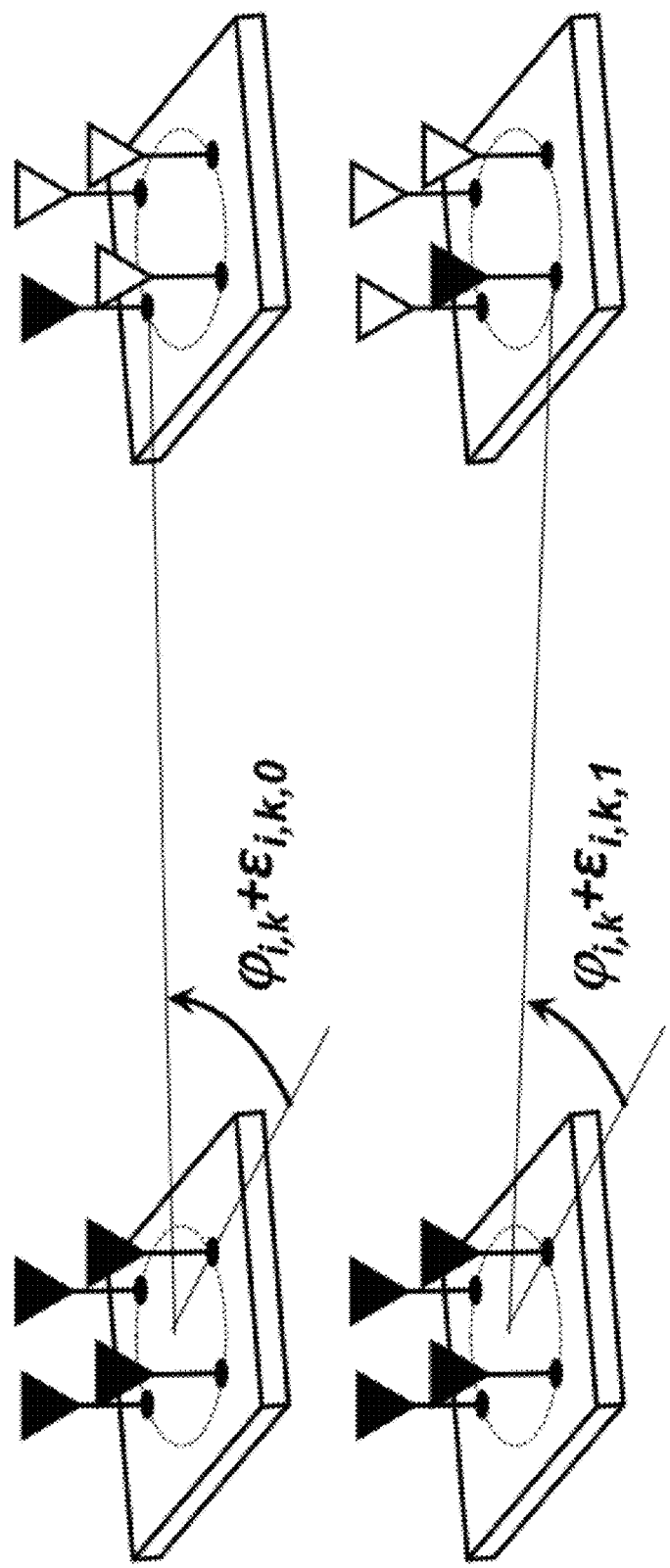
FIGS. 12($a$)-12($d$) illustrate schematic isometric diagrams of arrangements of two beacon nodes each having four beacon antennas that measure mutual angles, according to the teachings of this disclosure.
Figure 12B:
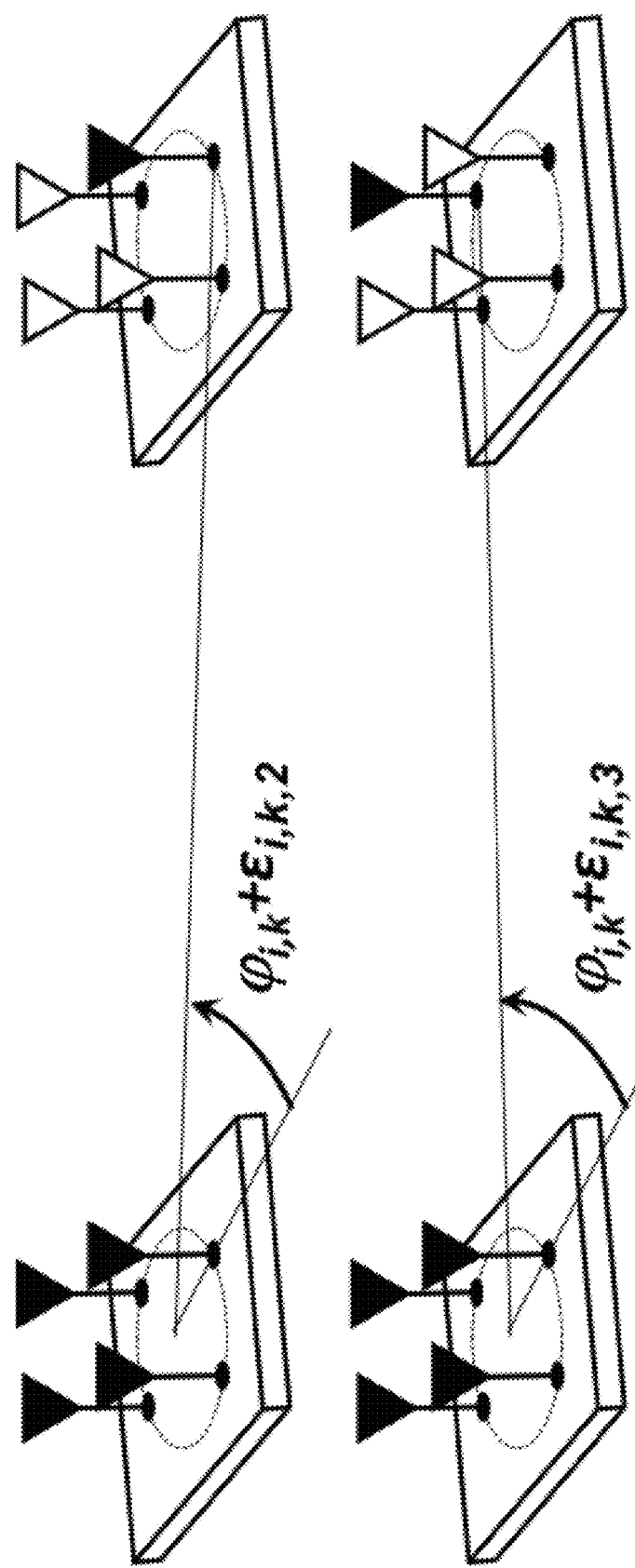
Figure 12C:
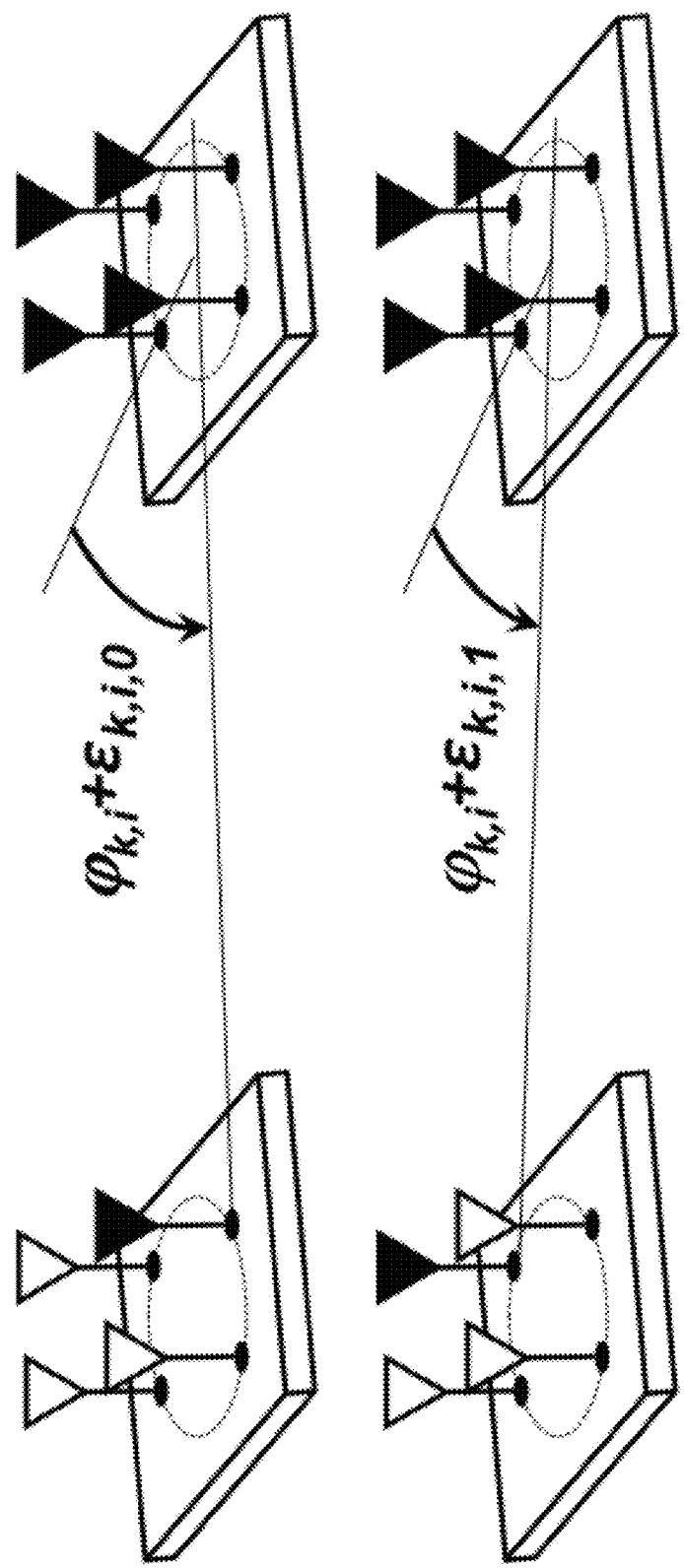
Figure 12D:
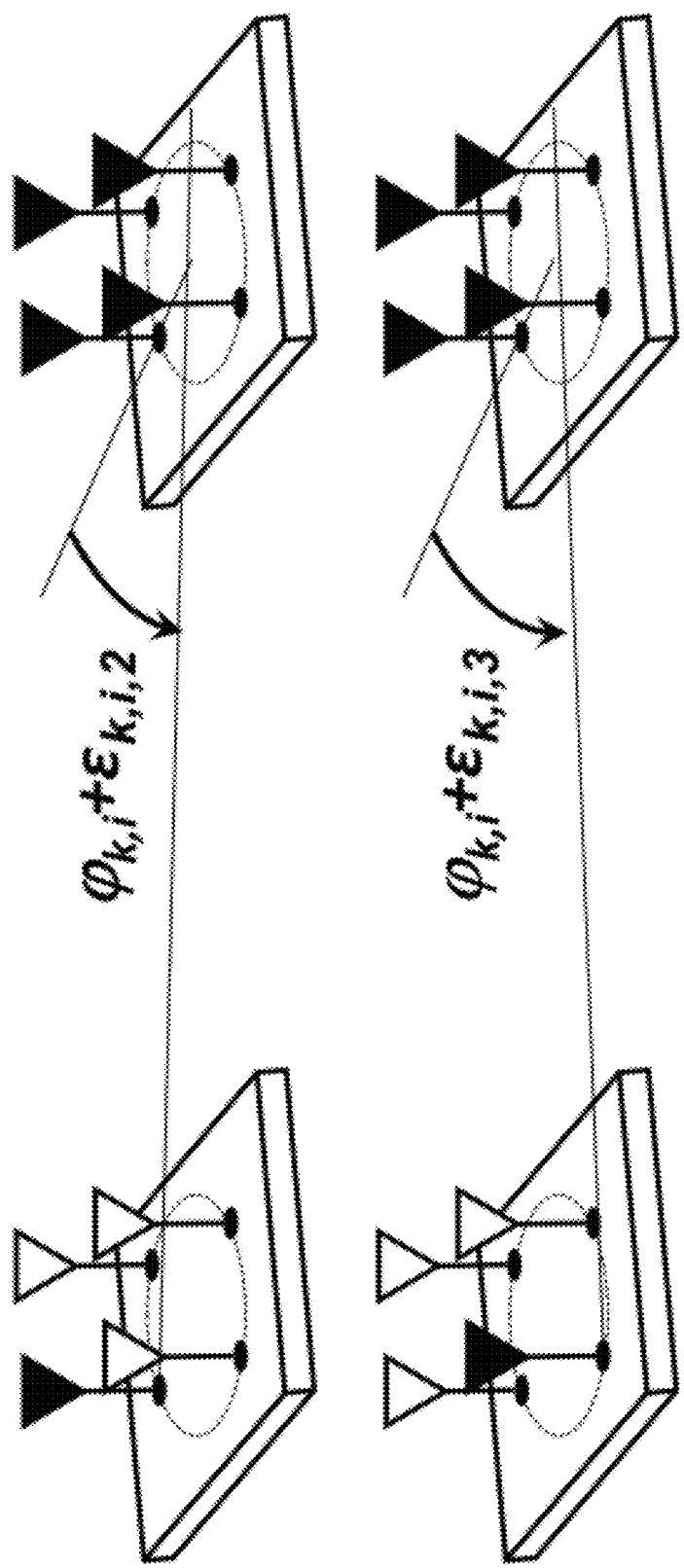

Referring to FIG. 11, depicted is a schematic graph of another stochastic error of estimation, according to the teachings of this disclosure. FIG. 11 shows the noise on the estimated elevation angle. Its standard deviation is 1.2 degrees, similarly to that of the azimuth AoA estimate that is evaluated simultaneously. Note the variance increase with respect to the case without elevation. Stochastic error of the estimate for 0 when $\theta = 45°$ and the standard deviation of $\overline{\xi}_i, \overline{\xi}_j$ is 0.03 radian. The standard deviation of $\theta$ and $\phi$ are both cca. 1.2 degrees for each value of d.

Mitigation of Multi-Path Propagation Effects

Multi-path propagation will corrupt the phase estimates in an unpredictable manner, which results in an incompatible set of equations. A standard technique is to repeat the measurement at multiple channel frequencies (frequency diversity) and with several beacons (spatial diversity), and filtering the most incompatible equations from the estimation.

Example Algorithm:

Twelve (12) AoA measurements are made using 4 beacons and 3 channels. 9 equations—belonging to 3 beacons ($B_i = \{b_j | j \in \{0,1,2,3\}, j \neq i\}$)—are used at a time to compute the position estimate, resulting in four initial estimation rounds and four estimates $\hat{p}_i (I=0, \ldots, 3)$:

$$\hat{p}_i = \arg\min_p E(p, B_i, C_i) = \tag{34}$$

$$\arg\min_p \frac{1}{\|B_i\| \cdot \|C_i\|} \sum_{b \in B_i} \sum_{c \in C_i} |f_b(p) - \hat{\varphi}_{b,c}|^v + |g_b(p) - \hat{\theta}_{b,c}|^v$$

where
- i indicates the current round of iterations
- $B_i$ denotes the set of selected beacons that participate in the iteration of the estimation
- $C_i$ denotes the set of selected channels that participate in the iteration of the estimation
- $\|B_i\|, \|C_i\|$ denotes the number of elements in the respective sets
- $\hat{p}_i$ denotes the position estimate obtained from the $i^{th}$ iteration, yielding the minimum error $E_i$
- p denotes the position coordinate used in the evaluation of E,f,g
- E(p,B,C) is the error of the AoA estimated with respect to the measurements obtained by the set of beacons B using the channels C, assuming the position p.
- Note: Although E is symmetrical in the errors w.r.t. $\hat{\varphi}_{b,c}$ and $\hat{\theta}_{b,c}$, a different linear or nonlinear combination may be practical, depending on the beacon arrangements and antenna characteristics
- $\hat{\varphi}_{b,c}, \hat{\theta}_{b,c}$ are the azimuth and elevation angles measured with respect to beacon b using channel c, respectively
- $f_b$ is the azimuth angle with respect to beacon b assuming the position p
- $g_b$ is the elevation angle with respect to beacon b assuming the position p
- $|\cdot|^v$ is the power v of the absolute value. v=2 is proposed. The case of $v \to \infty$ is equivalent to minimizing the maximum absolute error.

Finding the solution for equation (34) may comprise three steps (repeated in each round):

1. Find multiple initial values by geometrical construction of the exact solutions that satisfy subsets of the equations.
2. Average these solution to yield a single initial value.
3. Using the initial estimate start a search for the optimum using the Least Mean Square (LMS) algorithm or a convenient variant of it.

In each iteration round, the obtained estimate is placed into all the 12 equations. The residual error is first evaluated using the equations that participated in the estimation $E(\hat{p}_i, B_i)$, then using the equations that have been left out $E(\hat{p}_i, \overline{B}_i)$. The difference (—or alternatively—the ratio) of the two is selected as a possible metric that scores the beacon that was left out of the ith estimation:

$$S_i = E(\hat{p}_i, \overline{B}_i) - E(\hat{p}_i, B_i) \quad (35)$$

Greater score indicates more incompatibility, attributed to higher signal impairment levels suffered with the respective beacon node. The procedure is repeated for the other beacons as well, and the beacon with the highest incompatibility score is dismissed. (This beacon selection procedure is based on heuristics and is by no means optimal. It works best if the error is identically sensitive to all beacons, and uncorrelated between beacons.)

$$B_{FINAL} = \left\{ b_i \mid i = \{0, \ldots, 3\} \backslash \arg\max_i S_i \right\} \quad (36)$$

The 9 equations remaining after beacon selection can be solved in LS sense (or further reduced to select the best channel per each beacon).

Duty-Cycle

A single position estimation may require multiple measurements. Each measurement can take as long as the longest frame plus the overheads. As a rough approximation, a robust measurement requires twelve 128-byte long frames, 4 ms in duration each, e.g., somewhat more than 48 ms in total. In the case of the reverse mode, a single 4 ms packet is sufficient, since all beacons can listen to it concurrently. Better signal-to-noise levels allow for shorter measurements or more multi-path mitigation. Shorter measurements reduce accuracy.

Repeating the position estimation at a 1-10 second update rate (with varying accuracy) yields a 1% duty cycle. Thus 10-20 mA peak current consumption results in 100-200 µA average current consumption. Adaptation of the repetition rate and the measurement duration is possible based on:

Wake-up period adapted to
  time of the day/week (less frequent during the night and/or during week-ends)
  current position (close to some specific object or forbidden zone)
  displacement detection mechanism described previously
  other activity or parameter change in the system or in the node, etc. . . .
Measurement length adapted to required accuracy, and environmental conditions
Abortion of AoA estimation (and the rest) if primary data indicates no displacement with respect to previous estimated position As a result, the average current consumption can be brought down to the tens of micro-amperes over the life-cycle of the node, which is convenient in the case of most applications.

(Self-)Calibration

So far, unknown (or non-deterministic) non-idealities and known beacon positions and orientations have been assumed. In reality, some of the non-idealities can be measured and compensated for before deployment, on one hand, whereas the beacon positions and orientations are not accurately known after deployment, on the other. The differences in the PCB traces will contribute a deterministic amount of phase difference to $\Delta\beta_{i,j}$ in the measurement models. This amount starts to become significant if, for instance, the trace length differences exceed 0.1% of the wave length, i.e., cca. 0.1 mm. A great part of this error can be measured before deployment and be compensated for in the calculations. Temperature dependence can either be compensated for by updating the correction term as a function of the measured temperature, or by re-calibrating the correction factors after deployment as part of the position calibration.

Calibration procedures work with either the forward or the backward AoA estimation methods. No distinction is made in this respect in the discussion. Calibration of the network can take varying forms (as explained later), but the elementary principles are common. For simplicity these are presented in a 2-dimensional setting.

Consider two beacons with unknown positions and orientations. Referring now to FIGS. 12(a)-12(d), depicted are schematic isometric diagrams of arrangements of two beacon nodes each having four beacon antennas that measure mutual angles, according to the teachings of this disclosure. FIGS. 12(a)-12(d) show how two nodes may measure mutual angles $\phi_{(I,K)}$ and $\phi_{(K,I)}$ for determining relative orientation with respect to each other. First, node i uses its four antennas and node k uses a single antenna (playing the role of the RF-tag) then the other way around. Each node has four options to select the antenna used when they are not switched. Aggregation of the results obtained with each antenna can take the form of a linear combination or a selection (to counter multi-path).

Figure 13:
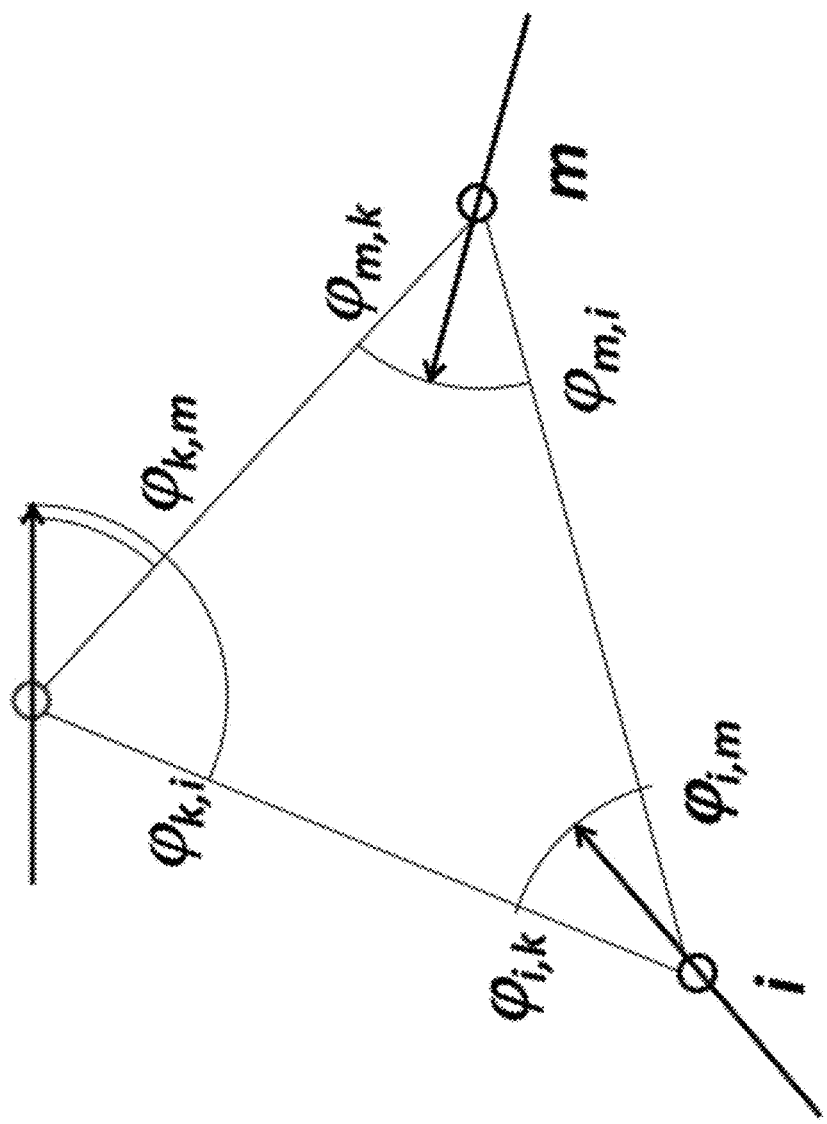
FIG. 13 illustrates a schematic representation of a result of measurements between three beacon nodes, each represented by a position and an orientation in two dimensions.

Referring to FIG. 13, depicted is a schematic representation of a result of measurements between three beacon nodes, each represented by a position and an orientation in two dimensions. FIG. 13 shows three nodes with arbitrary orientation and position but not lying on the same line. By applying the pair-wise measurements shown in FIG. 12, the respective angles and orientation can be determined. The scaling and orientation of the triangle that connects their center point is undetermined. The angles are homomorphic with respect to scaling of the beacon arrangement, thus absolute distances cannot be determined from the mutual measurements. The distance of two nodes has to be measured by an external method to determine the scaling. More constraining data yields over-determined estimation problems and more accurate estimates. The orientation of the beacon network requires externally measuring the orientation of at least one (two) line(s) that connect beacon positions in the case of 2 or 3 dimensions.

(Re-)calibration of the entire beacon network can occur in two ways:

Self-calibration: only the normally applied beacons are used in the calibration
Extended-calibration: auxiliary beacons are introduced into the calibration In self-calibration, some of the beacons are calibrated by external references, and have perfectly known positions (and orientations). They provide absolute anchor coordinates as constraints for the estimation. However, each and every beacon participates in determining their own and each other's positions and orientations. There are two disadvantages to this method:

anchor nodes might be difficult to access after deployment for measuring their exact position (and orientation)
calibration maximizes the accuracy of the localization between peer beacons as opposed to the localization of RF tags that occur in a different domain of the space (plane).

Therefore, a practically more feasible method, which might provide better accuracy is when auxiliary beacons are deployed (temporarily) in the spatial region where RF-tags are expected to occur. The position (and orientation) of each auxiliary beacon node has to be measured by an external method before the beacon network is calibrated. The auxiliary beacons may be moved around and the calibration can be refined by aggregating the results. No special requirements are made on synchrony for the workability of the localization procedure.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for locating a radio frequency tag using spatially separated beacon nodes, said method comprising the steps of:
providing at least one beacon node comprising a plurality of antennas coupled with an antenna switch, a radio frequency device coupled with the antenna switch, and a microcontroller having outputs and at least one input, the microcontroller being coupled with the radio frequency device and with said antenna switch;
transmitting a plurality of beacon symbols from cyclically selected antennas of each of a plurality of beacon nodes, wherein the microcontroller is configured to select an antenna by controlling said antenna switch through its outputs and wherein the radio frequency device provides timing pulses to the at least one input of the microcontroller which trigger the microcontroller to perform an antenna switch at a symbol boundary;
receiving the plurality of beacon symbols at a radio frequency (RF) tag;
determining phase jumps of the plurality of beacon symbols received at the RF tag and the respective selected antennas transmitting each of the plurality of beacon symbols for each of the plurality of beacon nodes;
estimating an angle-of-arrival (AoA) of the plurality of beacon symbols transmitted from each of the plurality of beacon nodes;
estimating an AoA vector for each of the plurality of beacon nodes from the respective AoA estimates; and
estimating a spatial location of the RF tag from the AoA vectors.

2. The method according to claim 1, wherein each next one of the plurality of beacon symbols is transmitted from a next one of the cyclically selected antennas.

3. The method according to claim 1, wherein every other next one of the plurality of beacon symbols is transmitted from a next one of the cyclically selected antennas.

4. The method according to claim 1, wherein the plurality of beacon symbols are payload portions of transmission frames.

5. The method according to claim 1, wherein the step of estimating the AoA of the plurality of beacon symbols transmitted from each of the plurality of beacon nodes comprises the step of determining the phase jump of each one of the plurality of beacon symbols in relation to a respective one of the cyclically selected antennas transmitting the one of the plurality of beacon symbols.

6. The method according to claim 1, wherein the step of estimating the AoA of the plurality of beacon symbols transmitted from each of the plurality of beacon nodes comprises the step of determining the phase jump of every other one of the plurality of beacon symbols in relation to a respective one of the cyclically selected antennas transmitting the every other one of the plurality of beacon symbols.

7. The method according to claim 1, wherein the step of estimating the AoA provides an azimuth angle estimation.

8. The method according to claim 1, wherein the step of estimating the AoA provides an elevation angle estimation.

9. The method according to claim 1, further comprising the steps of calibrating position and orientation of each one of the plurality of beacon nodes by
transmitting a plurality of beacon symbols from the cyclically selected antennas of a one of the plurality of beacon nodes; and
receiving the plurality of beacon symbols on another one of the plurality of beacon nodes with a one of the antennas of the another one of the plurality of beacon nodes.

10. The method according to claim 1, further comprising the steps of calibrating position and orientation of each one of the plurality of beacon nodes by
transmitting a plurality of beacon symbols from a one of the antennas of a one of the plurality of beacon nodes; and
receiving the plurality of beacon symbols on another one of the plurality of beacon nodes with the cyclically selected antennas of the another one of the plurality of beacon nodes.

11. The method according to claim 1, further comprising the steps of:
providing a central processing node; and
providing a network for coupling the central processing node to the plurality of beacon nodes.

12. The method according to claim 1, wherein the beacon symbols are direct sequence spread spectrum (DSSS) symbols, the method further comprises
after receiving a timing pulse at the microcontroller synchronizes a subsequent antenna switch to a transmitted symbol.

13. The method according to claim 12, wherein the microcontroller comprises a timer for performing said synchronization.

14. The method according to claim 13, wherein a symbol length is 16 microseconds.

15. A method for locating a radio frequency tag using spatially separated beacon nodes, said method comprising the steps of:
providing at least one beacon node comprising a plurality of antennas coupled with an antenna switch, a radio frequency device coupled with the antenna switch, and a microcontroller having outputs and at least one input, the microcontroller being coupled with the radio frequency device and with said antenna switch;
transmitting a plurality of beacon symbols from an antenna of a radio frequency (RF) tag;
receiving the plurality of beacon symbols on cyclically selected antennas of each of a plurality of beacon nodes, wherein the microcontroller is configured to select an antenna by controlling said antenna switch through its outputs and wherein the radio frequency device provides timing pulses to the at least one input of the microcontroller which trigger the microcontroller to perform an antenna switch at a symbol boundary;
determining phase jumps of the plurality of beacon symbols transmitted from the RF tag and the respective selected antennas receiving each of the plurality of beacon symbols for each of the plurality of beacon nodes;
estimating an angle-of-arrival (AoA) of the plurality of beacon symbols received at each of the plurality of beacon nodes;

estimating AoA vectors of each of the plurality of beacon nodes from the AoA estimates; and estimating a spatial location of the RF tag from the AoA vectors.

16. The method according to claim 15, wherein each next one of the plurality of beacon symbols is received at a next one of the cyclically selected antennas.

17. The method according to claim 15, wherein every other next one of the plurality of beacon symbols is received at a next one of the cyclically selected antennas.

18. The method according to claim 15, wherein the plurality of beacon symbols are payload portions of transmission frames.

19. The method according to claim 15, wherein the step of estimating the AoA of the plurality of beacon symbols received at each of the plurality of beacon nodes comprises the step of determining the phase jump of each one of the plurality of beacon symbols in relation to a respective one of the cyclically selected antennas receiving the one of the plurality of beacon symbols from the RF tag.

20. The method according to claim 15, wherein the step of estimating the AoA of the plurality of beacon symbols received at each of the plurality of beacon nodes comprises the step of determining the phase jump of every other one of the plurality of beacon symbols in relation to a respective one of the cyclically selected antennas receiving the every other one of the plurality of beacon symbols from the RF tag.

21. The method according to claim 15, wherein the step of estimating the AoA provides an azimuth angle estimation.

22. The method according to claim 15, wherein the step of estimating the AoA provides an elevation angle estimation.

23. The method according to claim 15, further comprising the steps of calibrating position and orientation of each of the plurality of beacon nodes by transmitting a plurality of beacon symbols from the cyclically selected antennas of a one of the plurality of beacon nodes; and receiving the plurality of beacon symbols on another one of the plurality of beacon nodes with a one of the antennas of the another one of the plurality of beacon nodes.

24. The method according to claim 15, further comprising the steps of calibrating position and orientation of each one of the plurality of beacon nodes by transmitting a plurality of beacon symbols from a one of the antennas of a one of the plurality of beacon nodes; and receiving the plurality of beacon symbols on another one of the plurality of beacon nodes with the cyclically selected antennas of the another one of the plurality of beacon nodes.

25. The method according to claim 15, further comprising the steps of:

providing a central processing node; and providing a network for coupled the central processing node to the plurality of beacon nodes.

26. The method according to claim 15, wherein the beacon symbols are direct sequence spread spectrum (DSSS) symbols and the radio frequency device determines a phase and magnitude information of each received symbol, the method further comprises after receiving a timing pulse at the microcontroller, reading phase and magnitude information by the microcontroller from the radio frequency device through an interface between the microcontroller and the radio frequency device.

27. The method according to claim 26, wherein the interface is a serial interface.

28. The method according to claim 26, wherein a symbol length is 16 microseconds and the microcontroller comprises a timer to synchronize an antenna switch to a symbol.

* * * * *